(12) United States Patent
Berg et al.

(10) Patent No.: US 6,823,419 B2
(45) Date of Patent: *Nov. 23, 2004

(54) METHOD AND APPARATUS FOR INHIBITING A SELECTED IDE COMMAND

(75) Inventors: Charles R. Berg, Cupertino, CA (US); Bao Pham, San Jose, CA (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/614,570

(22) Filed: Jul. 7, 2003

(65) Prior Publication Data

US 2004/0054840 A1 Mar. 18, 2004

Related U.S. Application Data

(63) Continuation of application No. 09/573,663, filed on May 18, 2000, now Pat. No. 6,629,184.

(51) Int. Cl.[7] .......................... G06F 13/38; G06F 13/40
(52) U.S. Cl. ...................................... 710/306; 710/305
(58) Field of Search ................................. 710/305–317

(56) References Cited

U.S. PATENT DOCUMENTS

| 5,126,890 A | 6/1992 | Wade et al. | |
|---|---|---|---|
| 5,268,960 A | 12/1993 | Hung et al. | 712/300 |
| 5,446,877 A * | 8/1995 | Liu et al. | 714/1 |
| 5,559,993 A | 9/1996 | Elliott et al. | 711/163 |
| 6,272,533 B1 | 9/2001 | Browne | 709/213 |
| 2002/0040418 A1 | 4/2002 | Bress et al. | 711/112 |

FOREIGN PATENT DOCUMENTS

| CN | 1293406 A | 5/2001 |
|---|---|---|
| EP | 0 827 059 | 3/1998 |
| GB | 2 230 881 | 10/1990 |
| JP | 03110620 | 5/1991 |
| JP | 10003362 | of 1998 |
| JP | 10133951 | 5/1998 |
| WO | 93/09495 | 5/1993 |
| WO | 02/27445 | 4/2002 |

OTHER PUBLICATIONS

International Search Report for Int'l patent App. No.: PCT/US01/16267.
English language abstract of Publication No. CN 1293406 A.
Fujitsu IDE Hard Disk Drives—Feb. 18, 2000 (admitted prior art).
Bit Micro Networks E–Disk ATX35 Ultra DMA Flash Disk and Solid State Disk Storage Solution—Feb. 18, 2000 (admitted prior art).
U.S. patent application Ser. No. 09/338,262, Stockdale, filed Jun. 22, 1999.

* cited by examiner

*Primary Examiner*—Paul R. Myers
(74) *Attorney, Agent, or Firm*—Marshall, Gerstein & Gorun LLP

(57) ABSTRACT

An interface circuit replaces a selected IDE command received from a host computer with an invalid command and routes the invalid command to a data storage device. In this manner, the interface circuit provides convenient, cost-effective technique for preventing a selected IDE command sent by the host computer from reaching the data storage device. Moreover, by replacing the selected command with an invalid command, rather than merely blocking the selected command, the data storage device can respond with an error message rather than leaving the data storage device and the IDE bus in a non-deterministic state that might require user intervention. The interface circuit is particularly well-suited for preventing a host computer from writing to an IDE hard disk drive in a gaming machine.

30 Claims, 19 Drawing Sheets

| NAME | SOURCE | SIGNAL | PIN | PIN | SIGNAL | SOURCE | NAME |
|---|---|---|---|---|---|---|---|
| RESET | I | RESET | 1 | 2 | GROUND | | GROUND |
| DATA BUS BIT 7 | I/O | DD7 | 3 | 4 | DD8 | I/O | DATA BUS BIT 8 |
| DATA BUS BIT 6 | I/O | DD6 | 5 | 6 | DD9 | I/O | DATA BUS BIT 9 |
| DATA BUS BIT 5 | I/O | DD5 | 7 | 8 | DD10 | I/O | DATA BUS BIT 10 |
| DATA BUS BIT 4 | I/O | DD4 | 9 | 10 | DD11 | I/O | DATA BUS BIT 11 |
| DATA BUS BIT 3 | I/O | DD3 | 11 | 12 | DD12 | I/O | DATA BUS BIT 12 |
| DATA BUS BIT 2 | I/O | DD2 | 13 | 14 | DD13 | I/O | DATA BUS BIT 13 |
| DATA BUS BIT 1 | I/O | DD1 | 15 | 16 | DD14 | I/O | DATA BUS BIT 14 |
| DATA BUS BIT 0 | I/O | DD0 | 17 | 18 | DD15 | I/O | DATA BUS BIT 15 |
| GROUND | | GROUND | 19 | 20 | N.C. | | NO CONNECTION |
| DMA REQUEST | O | DMARQ | 21 | 22 | GROUND | | GROUND |
| I/O WRITE | I | DIOW | 23 | 24 | GROUND | | GROUND |
| I/O READ | I | DIOR | 25 | 26 | GROUND | | GROUND |
| I/O CHANNEL READY | O | IORDY | 27 | 28 | SPSYNC: CSEL | | SPINDLE SYNC or CABLE SELECT |
| DMA ACKNOWLEDGE | I | DMACK | 29 | 30 | GROUND | | GROUND |
| INTERRUPT REQUEST | O | INTRQ | 31 | 32 | IOCS16 | O | 16 BIT I/O |
| ADDRESS BIT 1 | I | DA1 | 33 | 34 | PDIAG | | PASSED DIAGNOSTIC |
| ADDRESS BIT 0 | I | DA0 | 35 | 36 | DA2 | I | ADDRESS BIT 2 |
| CHIP SELECT 0 | I | CS1FX | 37 | 38 | CS3FX | I | CHIP SELECT 1 |
| DRIVE ACTIVE/ DRIVE 1 PRESENT | O | DASP | 39 | 40 | GROUND | | GROUND |

| COMMAND NAME | COMMAND CODE |
|---|---|
| NOP | 00h |
| CFA REQUEST EXTENDED ERROR CODE | 03h |
| DEVICE RESET | 08h |
| READ SECTOR(S) | 20h |
| WRITE SECTOR(S) | 30h |
| CFA WRITE SECTORS WITHOUT ERASE | 38h |
| READ VERIFY SECTOR(S) | 40h |
| SEEK | 70h |
| CFA TRANSLATE SECTOR | 87h |
| EXECUTE DEVICE DIAGNOSTIC | 90h |
| INITIALIZE DEVICE PARAMETERS | 91h |
| DOWNLOAD MICROCODE | 92h |
| PACKET | A0h |
| IDENTIFY PACKET DEVICE | A1h |
| SERVICE | A2h |
| SMART | B0h |
| CFA ERASE SECTORS | C0h |
| READ MULTIPLE | C4h |
| WRITE MULTIPLE | C5h |
| SET MULTIPLE MODE | C6h |
| READ DMA QUEUED | C7h |
| READ DMA | C8h |
| WRITE DMA | CAh |
| WRITE DMA QUEUED | CCh |
| CFA WRITE MULTIPLE WITHOUT ERASE | CDh |
| GET MEDIA STATUS | DAh |
| MEDIA LOCK | DEh |
| MEDIA UNLOCK | DFh |
| STANDBY IMMEDIATE | E0h |
| IDLE IMMEDIATE | E1h |
| STANDBY | E2h |
| IDLE | E3h |
| READ BUFFER | E4h |
| CHECK POWER MODE | E5h |
| SLEEP | E6h |
| FLUSH CACHE | E7h |
| WRITE BUFFER | E8h |
| IDENTIFY DEVICE | ECh |
| MEDIA EJECT | EDh |
| SET FEATURES | EFh |
| SECURITY SET PASSWORD | F1h |
| SECURITY UNLOCK | F2h |
| SECURITY ERASE PREPARE | F3h |
| SECURITY ERASE UNIT | F4h |
| SECURITY FREEZE LOCK | F5h |
| SECURITY DISABLE PASSWORD | F6h |
| READ NATIVE MAX ADDRESS | F8h |
| SET MAX ADDRESS | F9h |
| VENDOR SPECIFIC | 9Ah,C0h-C3h,8xh,F0h,F7h,FAh-FFh |
| RETIRED | 11h-1Fh,71h-7Fh,94h-99h, DBh-DDh,E9h |
| OBSOLETE | 10h,21h-23h,31h-33h,3C,41h, 50h,C9h,CBh,EEh |

FIG. 7 (PRIOR ART)

IDE command and control register

| ADDRESS | | | | | NAME AND FUNCTION | |
|---|---|---|---|---|---|---|
| CS1FX | CS3FX | DA2 | DA1 | DA0 | READ ACCSESS | WRITE ACCSESS |
| *COMMAND REGISTER BLOCK* | | | | | | |
| 1 | 0 | 0 | 0 | 0 | DATA REGISTER | DATA REGISTER |
| 1 | 0 | 0 | 0 | 1 | ERROR REGISTER | FEATURE REGISTER |
| 1 | 0 | 0 | 1 | 0 | SECTOR COUNT REGISTER | SECTOR COUNT REGISTER |
| 1 | 0 | 0 | 1 | 1 | SECTOR NUMBER REGISTER | SECTOR NUMBER REGISTER |
| | | | | | SECTOR NUMBER OR BLOCK | SECTOR NUMBER OR BLOCK |
| | | | | | ADDRESS 0-7 | ADDRESS 0-7 |
| 1 | 0 | 1 | 0 | 0 | CYLINDER REGISTER 0 | CYLINDER REGISTER 0 |
| | | | | | CYLINDER 0-7 OR | CYLINDER 0-7 OR |
| | | | | | BLOCK ADDRESS 8-15 | BLOCK ADDRESS 8-15 |
| 1 | 0 | 1 | 0 | 1 | CYLINDER REGISTER 1 | CYLINDER REGISTER 1 |
| | | | | | CYLINDER 8-15 OR | CYLINDER 8-15 OR |
| | | | | | BLOCK ADDRESS 16-23 | BLOCK ADDRESS 16-23 |
| 1 | 0 | 1 | 1 | 0 | DRIVE/HEAD REGISTER | DRIVE/HEAD REGISTER |
| | | | | | DRIVE/HEAD NUMBER OR | DRIVE/HEAD NUMBER OR |
| | | | | | BLOCK ADDRESS 24-27 | BLOCK ADDRESS 14-31 |
| 1 | 0 | 1 | 1 | 1 | STATUS REGISTER | COMMAND REGISTER |
| *CONTROL REGISTER BLOCK* | | | | | | |
| 0 | 1 | 0 | 0 | 0 | NOT USED | NOT USED |
| 0 | 1 | 0 | 0 | 1 | NOT USED | NOT USED |
| 0 | 1 | 0 | 1 | 0 | NOT USED | NOT USED |
| 0 | 1 | 0 | 1 | 1 | NOT USED | NOT USED |
| 0 | 1 | 1 | 0 | 0 | NOT USED | NOT USED |
| 0 | 1 | 1 | 0 | 1 | NOT USED | NOT USED |
| 0 | 1 | 1 | 1 | 0 | ALTERNATE STATUS REGISTER | CONTROL REGISTER |
| 0 | 1 | 1 | 1 | 1 | ADDRESS REGISTER | NOT USED |

IDE status register

| 7 | 6 | 5 | 4 | 3 | 2 | 1 | 0 |
|---|---|---|---|---|---|---|---|
| BSY | DRDY | DWF | DSC | DRQ | CORR | IDX | ERR |

FIG. 8 (PRIOR ART)

IDE error register

| 7 | 6 | 5 | 4 | 3 | 2 | 1 | 0 |
|---|---|---|---|---|---|---|---|
| BBK | UNC | MC | IDNF | MCR | ABRT | TK0NF | AMNF |

FIG. 9 (PRIOR ART)

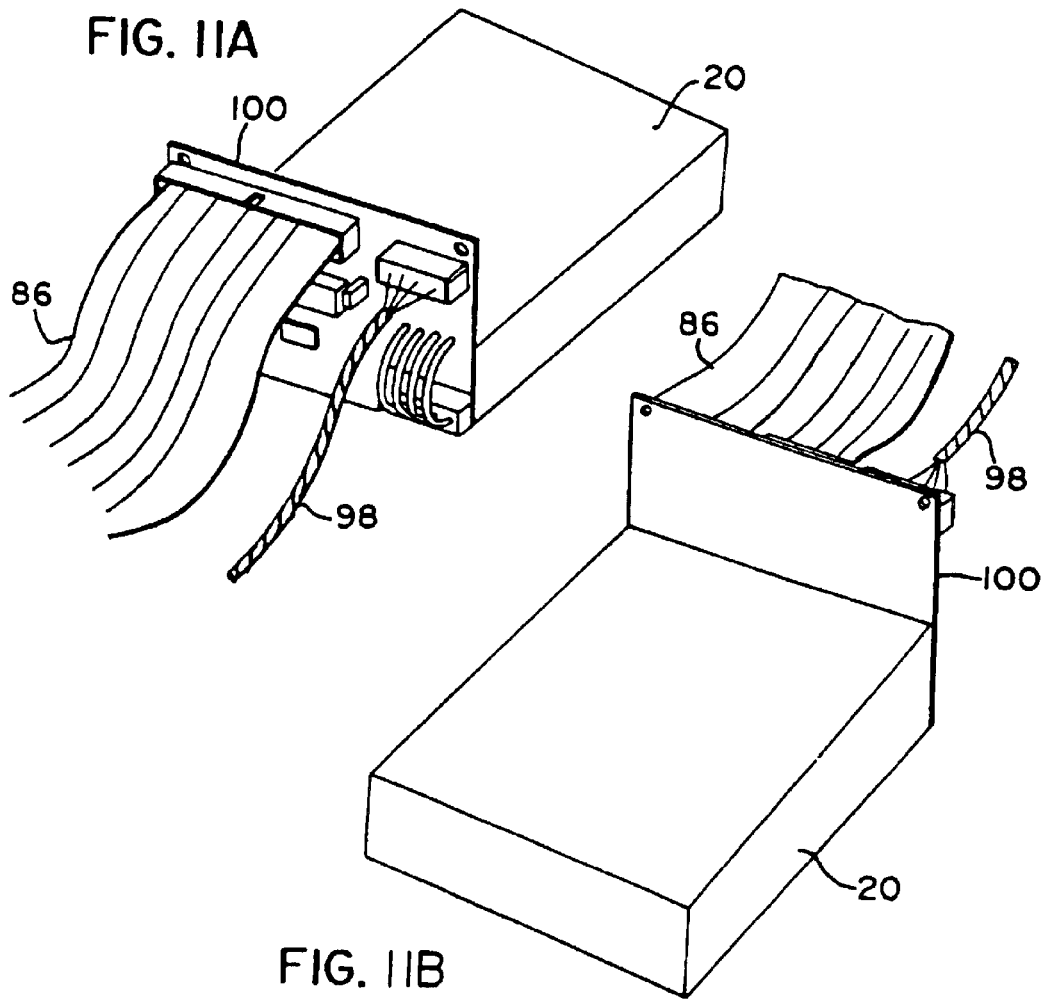
FIG. 11A
FIG. 11B
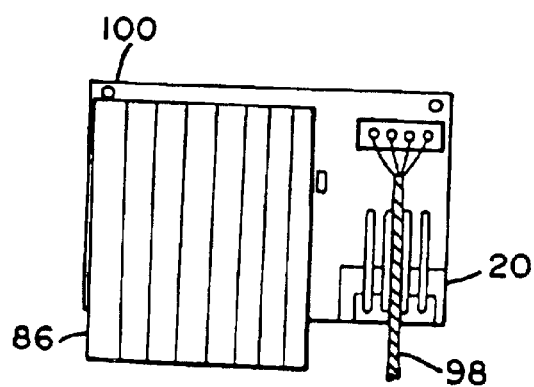
FIG. 11C

CPU 10 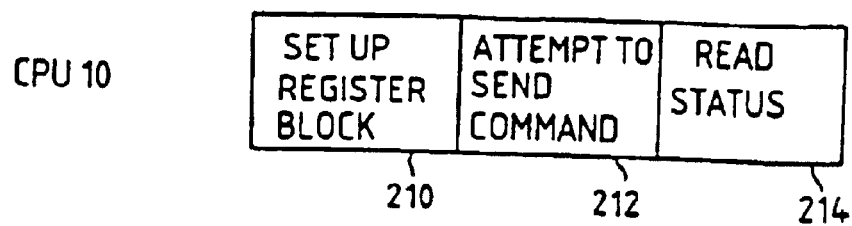
HARD DISK
DRIVE 20
DRDY 
BSY 
DRQ 
ERR 
ABRT 
INTRQ 
FIG. 18

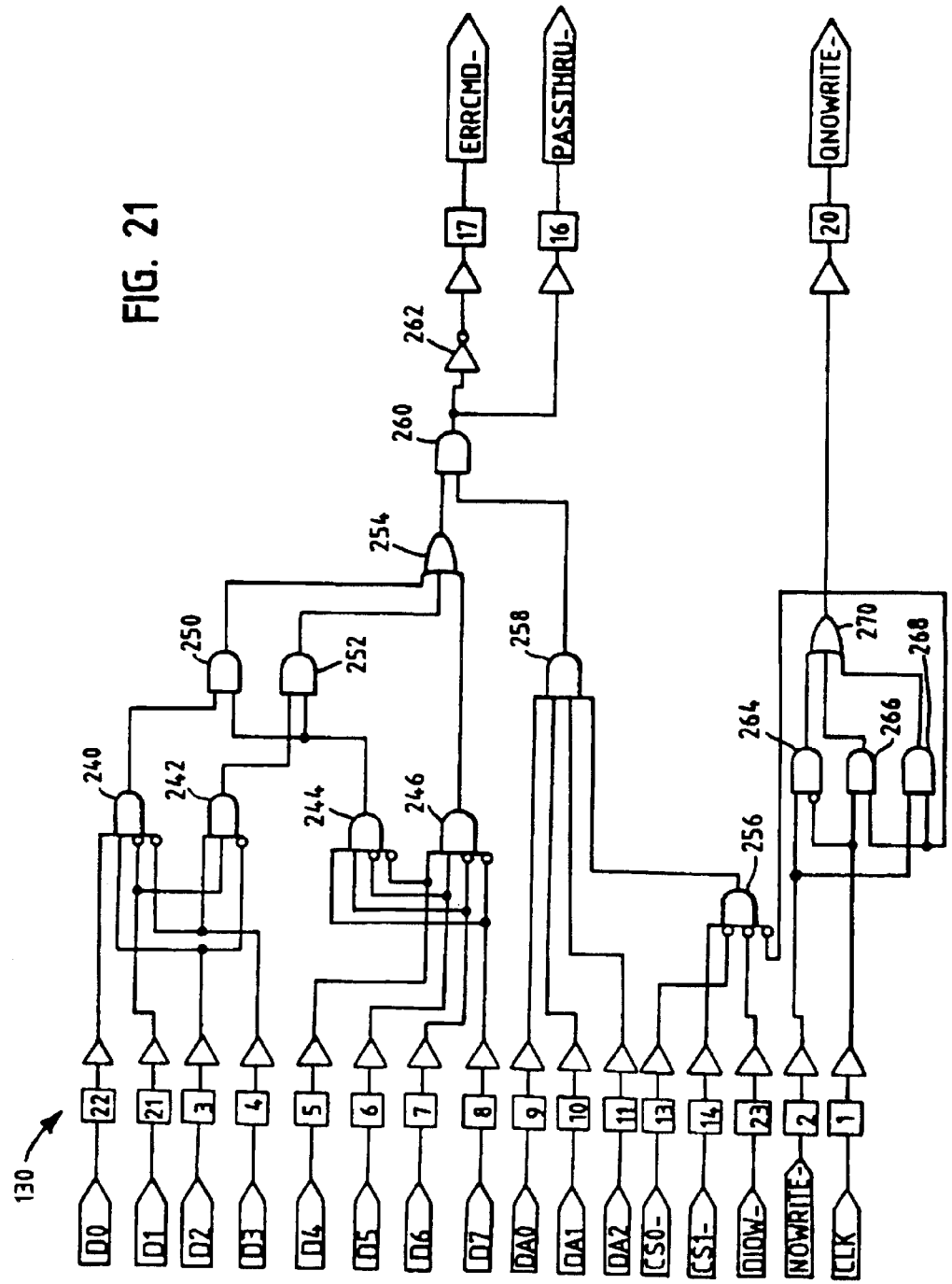

METHOD AND APPARATUS FOR INHIBITING A SELECTED IDE COMMAND

CROSS-REFERENCE TO RELATED APPLICATIONS

This application is a continuation of U.S. patent application Ser. No. 09/573,663, filed May 18, 2000, and entitled "Method and Apparatus for Inhibiting a Selected IDE Command," now U.S. Pat. No. 6,629,184. U.S. patent application Ser. No. 09/573,663 is hereby incorporated by reference herein in its entirety for all purposes.

BACKGROUND OF THE INVENTION

1. Field of the Invention

The present invention relates to selective IDE command transfer, and more particularly to a method and apparatus for inhibiting a selected IDE command (such as a write command) sent from a host computer from reaching a data storage device (such as a hard disk drive).

2. Description of Related Art

Host computers utilize data storage devices to provide increased storage capabilities to fulfill user demands. Hard disk drives are popular data storage devices. A hard disk drive generally includes several disks that each contain concentric tracks on both of their primary surfaces for storing data, a spin motor that rotates the disks about a central axis at a substantially constant rate, heads that read data from and write data to the disks (with one head per disk surface), an actuator assembly that radially positions the heads above the desired tracks, and circuitry such as a preamplifier, read channel and controller that transfers data between the heads and the host computer.

The host computer delivers access requests to the hard disk drive whenever the host computer desires to store or retrieve data. To perform the access request, the hard disk drive first positions the heads above the desired tracks of the rotating disks specified by the access request. Once the heads are properly positioned, the requested data transfer takes place. Writing is performed by delivering a write signal with polarity-switching current to a selected head while the head is positioned above the desired track, and the head induces magnetically polarized transitions into the desired track that are representative of the data being stored. Reading is performed by the head sensing the magnetically polarized transitions on the track As the disk spins below the head, the magnetically polarized transitions induce a varying magnetic field in the head which the head converts into an analog read signal that is amplified by the preamplifier, converted into a digital signal and processed by the read channel, and provided to the host computer.

The hard disk drive communicates with the host computer by an interface (or bus). The interface can be defined in many layers, including the cable or connector, the protocol, the peripheral device, and the commands. Although the ST412/506 and Enhanced Small Device Interface (ESDI) interfaces were widely used for earlier generations of hard disk drives, as more electronics (such as the formatter, data buffer and controller) have been integrated into more modern and intelligent drives, these earlier interfaces have been replaced by other interfaces. The two most popular modern hard disk drive interfaces are Integrated Drive Electronics (IDE) and Small Computer Systems Interface (SCSI). The IDE interface is often referred to as the AT-Attachment (ATA) since the integrated electronics within the drive emulate the hard disk controller of an IBM AT personal computer.

The IDE and SCSI interfaces differ in many respects. For instance, IDE permits the hard disk drive to integrate more electronics than SCSI. IDE typically links the host computer to one or two hard disk drives and/or CD-ROMs, whereas SCSI can link the host computer to seven or more devices including hard disk drives, tape drives, printers, scanners, CD-ROMs, optical storage and WORM drives, processors, and communication devices. IDE employs a 40-wire ribbon cable, whereas SCSI employs a 50-wire ribbon cable for an 8-bit data bus that links the host computer to seven devices. Further, Wide SCSI and Ultra SCSI implementations with 16- and 32-bit data buses, respectively, use wider cables that link the host computer to 15 and 31 devices, respectively. IDE is preferred over SCSI for low cost and ease of use, whereas SCSI offers more speed and capability than IDE and is often the choice over IDE in high-end PCs and workstations.

A critical factor in the mass production of computer systems is the associated production costs of the bus and related interface circuitry. Generally, the more signals a bus has and the more sophisticated the associated control logic, the more costly it becomes. The success of IDE and SCSI can be attributed to the availability of economical bus interface components and the fact that a simple ribbon cable can be used to interconnect the devices. However, the cost of IDE hard disk drives typically is significantly less than the cost of SCSI hard disk drives. For example, IDE hard disk drives can cost on the order of 50% less than SCSI hard disk drives with comparable performance (storage capacity, data transfer rate, average seek time, etc.). Moreover, IDE controllers are usually integrated on the motherboard of the host computer, whereas SCSI controllers are usually separate cards that must be purchased separately from the host computer and installed in one of the slots in the host computer. Thus, another disadvantage of SCSI hard disk drives as compared to IDE hard disk drives is the need to purchase an SCSI controller and to consume a slot in the host computer that might otherwise be used for another peripheral device.

In some applications, the host computer should be prevented from performing certain operations on the hard disk drive. For example, in gaming machines such as casino slot machines, it may be desirable to prevent the host computer from writing to the hard disk drive in order to prevent unauthorized changes to programs and data stored on the hard disk drive. As more gaming machines move towards personal computer based platforms, a convenient, cost-effective technique to write-inhibit the hard disk drive would be highly desirable.

SCSI hard disk drives typically have write-inhibit capability, however, as mentioned above, SCSI hard disk drives typically are significantly more expensive than IDE hard disk drives and require a slot in the host computer. IDE hard disk drives with write-protect jumpers have been reported in the literature. For instance, the Fujitsu M261xT IDE hard disk drives with write-protect jumpers have been discontinued, and the Bitmicro Networks E-Disk ATX35 solid state IDE hard disk drive with a write-protect jumper is prohibitively expensive. Unfortunately, the vast majority of IDE hard disk drives do not have write-protect jumpers or any other hardware-implemented write-inhibit capability. In another approach, U.S. Pat. No. 5,126,890 to Wade et al. discloses a security module for a removable hard disk drive, the module has a lockable hardware write protection feature in which a four position lock can be set to generate a control signal, and the hard disk drive becomes write protected in response to the control signal.

Furthermore, merely blocking a write command sent from a host computer along an IDE bus so that it fails to reach the hard disk drive is not a viable approach since this may leave the drive and the IDE bus in a non-deterministic state that requires user intervention.

Accordingly, none of the existing solutions provides a satisfactory approach to preventing the host computer from sending selected commands to a data storage device while allowing the manufacturer to choose from a wide variety of data storage devices. More particularly, none of the existing solutions provides a satisfactory technique for inhibiting a host computer from writing to an IDE hard disk drive while retaining the flexibility of selecting whatever IDE hard disk drive best suits the particular application.

SUMMARY OF THE INVENTION

The present invention solves the above and other problems, and thereby advances the useful arts, by providing an interface circuit that replaces a selected IDE command received from the host computer with an invalid command and routes the invalid command to a data storage device. Preferably, the interface circuit is placed between an IDE port of the host computer and an IDE port of a hard disk drive. In this manner, the interface circuit provides a convenient, cost-effective technique for inhibiting a selected IDE command sent by the host computer from reaching the data storage device. The interface circuit can be used with any IDE data storage device. Moreover, by replacing the inhibited command with an invalid command, rather than merely blocking the inhibited command, the data storage device can provide an error message rather than leaving the data storage device and IDE bus in a non-deterministic state that might require user intervention.

Generally speaking, the interface circuit includes a first port for communicating with an IDE interface of a host computer, a second port for communicating with an IDE interface of a data storage device, and a control circuit that sends an invalid command rather than a selected IDE command to the second port in response to receiving the selected IDE command at the first port.

Preferably, the data storage device is a hard disk drive, the selected IDE command is a write command, and the invalid command is a reserved IDE command. It is also preferred that the interface circuit routes any communication other than the selected command(s) received from the host computer to the data storage device, thereby permitting the host computer to read an error message that the data storage device generates in response to the invalid command.

In one embodiment, the interface circuit includes an external device that permits a user to enable and disable the command-inhibit function of the control circuit. When the command-inhibit function is enabled, the control circuit sends the invalid command rather than the selected IDE command to the second port in response to the selected IDE command being received at the first port. When the command-inhibit function is disabled, the control circuit sends the selected IDE command rather than the invalid command to the second port in response to the selected IDE command being received at the first port. The external device can be a mechanical switch or a pair of jumper pins.

In another embodiment, the interface circuit includes a printed circuit board, the first port is a 40-pin male connector that extends from a first major surface of the printed circuit board and plugs into an IDE ribbon cable connected to the host computer, and the second port is a 40-pin female connector that extends from a second major surface of the printed circuit board and plugs into the IDE port of the hard disk drive.

The present invention also includes a method of selectively transferring IDE commands between a host computer and a data storage device. In one embodiment, the method includes sending an IDE command from the host computer to a first IDE bus not connected to the data storage device, determining that the data storage device should not receive the IDE command, sending an invalid command rather than the IDE command to a second IDE bus connected to the data storage device, and sending an error message that the data storage device provides in response to the invalid command from the data storage device to the host computer via the first and second IDE buses. This not only prevents the host computer from sending the command to the data storage device, but also notifies the host computer that the desired operation has failed.

The method may also include periodically sending another IDE command from the host computer to the data storage device via the first and second buses to determine whether the data storage device received the IDE command that it should not have received.

The invention is particularly well-suited for preventing a host computer from writing to an IDE hard disk drive in a gaming machine such as a slot machine.

It is therefore an object of the present invention to provide an interface circuit that inhibits a selected IDE command sent by a host computer from reaching a data storage device.

It is another object of the present invention to provide an interface circuit that enables a data storage device to provide an error message to a host computer when a selected IDE command sent by the host computer has not reached the data storage device.

It is a further object of the present invention to provide a convenient, cost-effective technique for assuring that a host computer cannot make unauthorized changes to programs and data stored on an IDE data storage device.

These and other objects, features and advantages of the invention will be further described and more readily apparent from a review of the detailed description of the preferred embodiments which follows.

BRIEF DESCRIPTION OF THE DRAWINGS

The following detailed description of the preferred embodiments can best be understood when read in conjunction with the following drawings, in which:

FIG. 5 lists the IDE interface pin assignments in FIG. 2;

FIG. 6 lists the IDE commands defined by the ATA-5 specification;

FIG. 7 illustrates the IDE command register block in the hard disk drive in FIG. 2;

FIG. 8 illustrates the IDE status register in the hard disk drive in FIG. 2;

FIG. 9 illustrates the IDE error register in the hard disk drive in FIG. 2;

FIGS. 11A–11E are mechanical views, similar to FIGS. 10A–10E, respectively, showing the adapter board of the present invention installed between the hard disk drive and the IDE bus in FIG. 4;

FIG. 18 is a simplified timing diagram of an attempted write operation using the adapter board of the present invention when the write-inhibit function is enabled;

FIG. 21 is a logic diagram of the programmable array logic in FIG. 20.

DETAILED DESCRIPTION OF THE PREFERRED EMBODIMENTS

Figure 1:
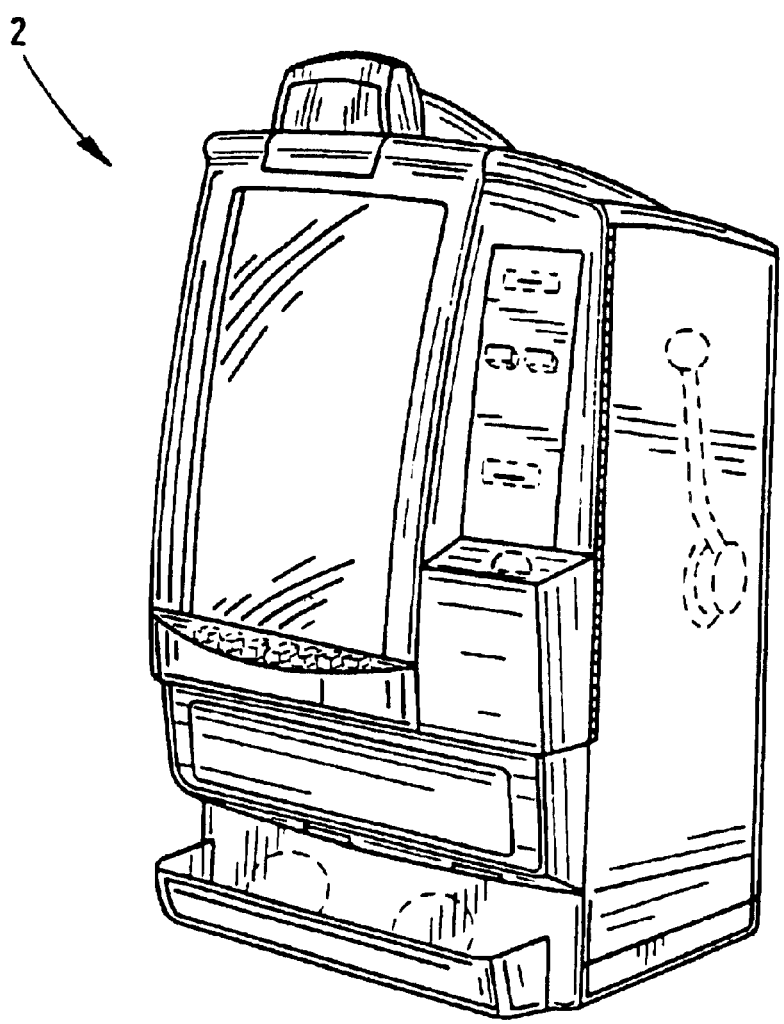
FIG. 1 is a perspective view of a conventional gaming machine as generally known in the art in which the structures and methods of the present invention may be advantageously applied.

While the present invention is susceptible to various modifications and alternative forms, specific embodiments thereof have been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a perspective view of an electronic gaming machine 2 that may embody the present invention.

Figure 2:
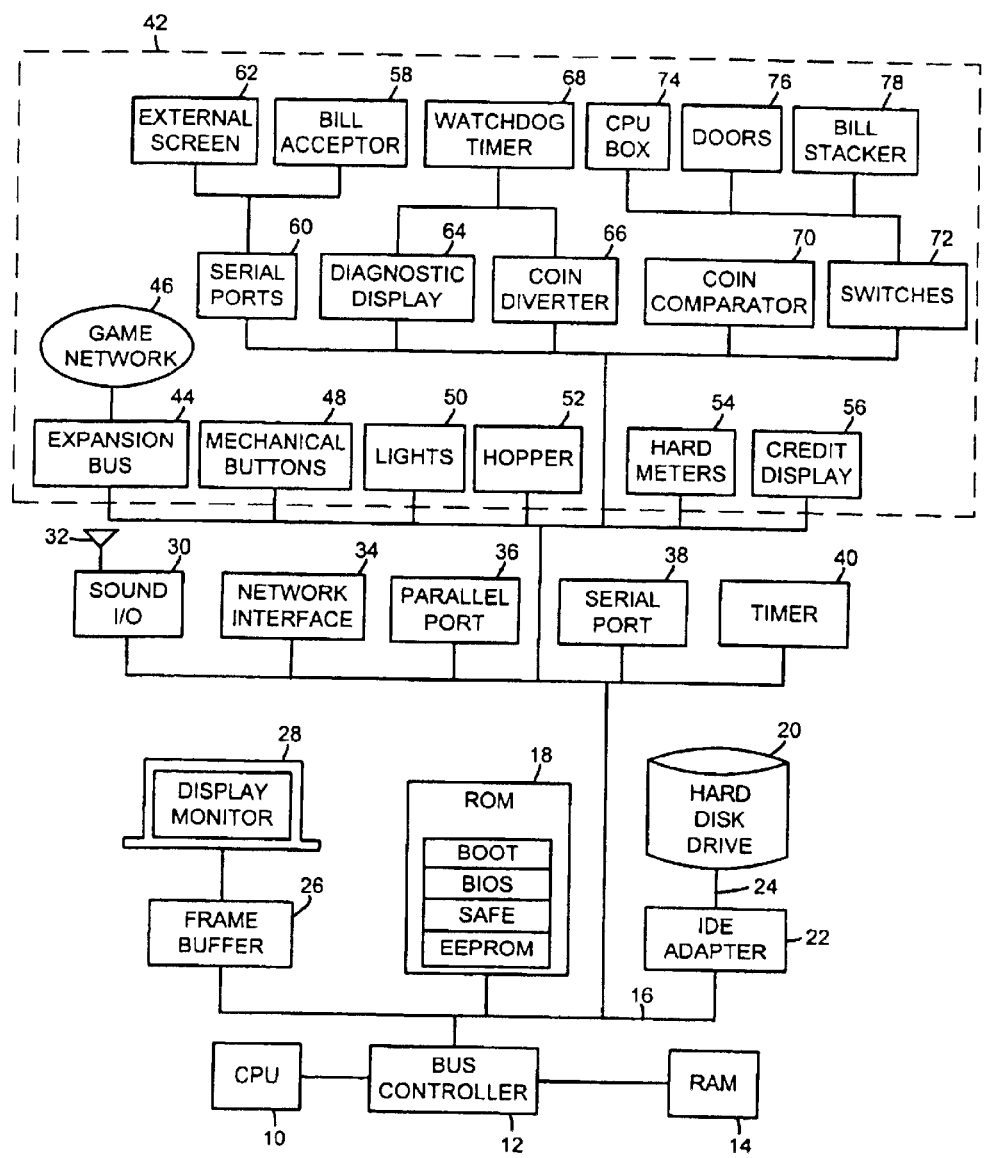
FIG. 2 is a block diagram of the electrical components in the gaming machine in FIG. 1.

FIG. 2 is a block diagram of the electrical components of gaming machine 2. Central processing unit (CPU) 10 such as a Pentium™-based microprocessor from Intel Corporation interfaces with bus controller 12 to access information available from various components and information from random access memory (RAM) 14 such as a 32 megabyte dynamic RAM. Bus controller 12 sends and receives information via system bus 16 to the various components. System bus 16 is not limited to a particular type and can be an ISA bus, EISA bus, PCI bus, or others. Moreover, system bus 16 can be linked to an external bus connector to further extend the system. Upon powering-up gaming machine 2, read only memory (ROM) 18 such as a battery-backed non-volatile static RAM is read and is used to configure the initial operational parameters.

Hard disk drive 20 provides mass data storage for gaming machine 2. Hard disk drive 20 stores game specific data set, such as program data, image data specifying the rules of various different games and the types of images or image sequences to be displayed to the game player, and sound data. Hard disk drive 20 has a storage capacity that is a function of the number of game variations provided as well as the amount of data for each game. In general, the more motion video designed into a particular game, the more storage required for the game software. Hard disk drive 20 is coupled to system bus 16 via IDE adapter 22 and IDE bus 24. More particularly, IDE adapter 22 is connected to system bus 16, and IDE bus 24 is connected between hard disk drive 20 and IDE adapter 22. Thus, hard disk drive 20 is an IDE data storage device and all communications between hard disk drive 20 and IDE adapter 22 occur along IDE bus 24 and conform to the IDE (or ATA) protocol.

Information to be displayed is written to frame buffer 26 and sent to display monitor 28. Sound input/output component 30 and speaker 32 broadcast sound information. Network interface 34 enables gaming machine 2 to be connected to a network such that a number of gaming machines can be connected for multi-player action. One or more parallel ports 36 and serial ports 38 provide connections to peripheral devices. Timer 40 provides clock pulses for synchronizing the components and the operation of gaming machine 2.

Block 42 illustrates the components dedicated to the operation of the game. These components can be a separate subsystem with its own system bus and the like. In the alternative, all of the components of gaming machine 2 can be integrated as a single system. Here, in this illustration, expansion bus 44 connects gaming machine 2 to a custom gaming network 46. Mechanical buttons 48 provide for user selection and input. Lights 50 can be programmed to flash in certain colors or patterns in response to a particular condition or system state. Hopper 52 tracks and dispenses coin drops and winnings. Hard meters 54 track in absolute terms the number of coins and bills accepted and the number of coins dispensed. Credit display 56 can be installed inside the cabinet of gaming machine 2 to display the available credits. Bill acceptor 58 is connected to serial port 60, as is external screen 62 to display low level messages. Diagnostic display 64 and coin diverter 66 are both are connected to watchdog timer 68. Coin comparator 70 ascertains the type of coins received. Interface switches 72 receive signals from a number of switches, including switches embedded in CPU box 74, doors 76, and bill stacker 78.

For illustration purposes, CPU 10, bus controller 12, RAM 14, bus 16, ROM 18, IDE adapter 22, frame buffer 26, sound I/O 30, network interface 34, parallel port 36, serial port 38 and timer 40 are considered the host computer in gaming machine 2. Of course, a wide variety of host computer configurations can be utilized, the critical elements being a processor coupled to an IDE adapter for communicating with an IDE data storage device.

Figure 3:
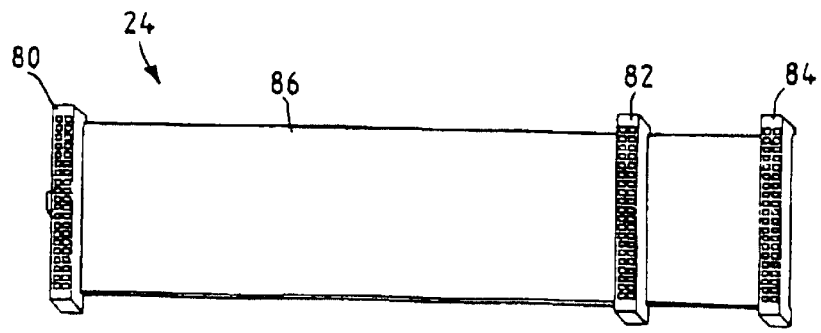
FIG. 3 is top plan view of the IDE bus in FIG. 2.

FIG. 3 is a top plan view of IDE bus 24 which includes system connector 80, master connector 82, slave connector 84, and ribbon cable 86. Connectors 80, 82 and 84 are each 40-pin female connectors crimped on 18-inch, 40-pin ribbon cable 86. System connector 80 is connected to IDE adapter 22, master connector 82 is connected to hard disk drive 20, and slave connector 84 is left unconnected (for illustration purposes gaming device 2 does not include a slave hard disk drive, although it could).

Figure 4:
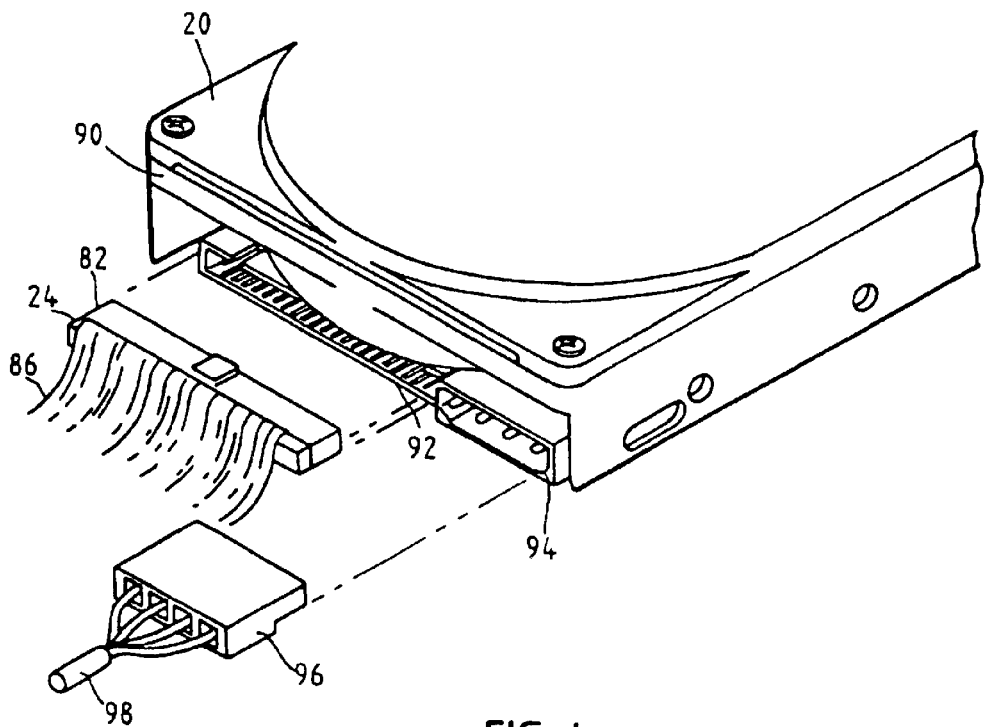
FIG. 4 is a perspective view of the connection between the hard disk drive and the IDE bus in FIG. 2.

FIG. 4 is a perspective view of the connection between hard disk drive 20 and IDE bus 24. Hard disk drive 20 includes side 90 that includes IDE connector 92 and power connector 94. IDE connector 92 is a 40-pin male connector that mates with master connector 82. In addition, power connector 94 is a 4-pin male connector that mates with and receives power from 4-pin female connector 96 of power cable 98. Thus, IDE bus 24 provides the IDE interface for hard disk drive 20, and power cable 98 provides the electrical power to hard disk drive 20.

FIG. 5 is a table of the IDE interface pin assignments. The ATA standard specifies signals by their names as well as by their abbreviations. Both the signal names and their abbreviations are written in capital letters. The signals that are active low are indicated with a bar over the name. Regarding the direction of data flow, I means to the drive, O means from the drive, I/O means bidirectional.

FIG. 6 lists the IDE commands defined in the ATA-5 specification. The IDE commands each have a unique command code (or opcode) in the range of 00h to FFh, where the trailing h signifies the hexadecimal numbering system in which each digit represents 1 of 16 numbers (0–15). Thus, there are 256 IDE command codes. As is seen, some IDE command codes represent defined IDE commands, other IDE command codes represent vendor specific commands, retired commands, or obsolete commands, and still other IDE command codes are reserved meaning they are undefined in current specifications. Some defined IDE commands are mandatory and other defined IDE commands are optional but may be implemented in accordance with the ATA standard. The reserved IDE commands are not understood by IDE data storage devices. Therefore, sending a reserved IDE command to an IDE data storage device causes the IDE data storage device to generate an error message.

Hard disk drive 20 (and other IDE data storage devices) contains a command register block and a control register block The command register block contains various registers at addresses 1F0h to 1F7h, and the control register block contains various registers at addresses 3F6h to 3F7h. Chip select 0 ($\overline{CS1FX}$) and chip select 1 ($\overline{CS3FX}$) differentiate between the blocks. As the names suggest, when the chip select 0 is asserted (or active) and chip select 1 is deasserted (or negated) an address in the range of 1F0h to 1FFh is selected which accesses the command register block. Likewise, when chip select 0 is deasserted and chip select 1 is asserted an address in the range of 3F0h to 3FFh is selected which accesses the control register block. Address bits 0 to 2 (DA0 to DA2) select a particular register within the blocks.

FIG. 7 illustrates the IDE command register block in hard disk drive 20. The IDE command register block includes a command register (1F7h during write access), a status register (1F7h during read access), and an error register (1F1h during read access). IDE commands are written to the command register, the status register contains the status of hard disk drive 20 as of the last command, and if an error bit in the status register is set then the error register contains the error code of the last executed command.

FIG. 8 illustrates the IDE status register in hard disk drive 20. The status bits are BSY (busy), DRDY (drive ready), DWF (drive write fault), DSC (drive seek complete), DRQ (data request), CORR (corrected data), IDX (index) and ERR (error). In particular, ERR indicates an error has occurred in the process of executing the previous command, and that the error register contains further information about the nature of the error.

FIG. 9 illustrates the IDE error register in hard disk drive 20. The error bits are BBK (bad block detected), UNC (uncorrectable data error), MC (media change), IDNF (ID not found), MCR (media change requested), ABRT (aborted command), TK0NF (track 0 not found) and AMNF (address mark not found). In particular, ABRT indicates that the command was interrupted because it was illegal or because of a disk drive error.

During normal operation, gaming machine 2 does not need to write to hard disk drive 20. Rather, hard disk drive 20 is used solely for storing programs and data that are read by CPU 10. Thus, gaming machine 2 uses hard disk drive 20 as a read-only device. Nonetheless, in certain circumstances CPU 10 may attempt to write to hard disk drive 20, for instance due to a programming error or an unauthorized user attempting to alter or destroy stored information that is intended to be inaccessible to the user. Furthermore, hard disk drive 20 lacks write-inhibit capability. As a result, it would be highly desirable to provide a convenient, cost-effective technique for assuring that CPU 10 cannot write to hard disk drive 20 even if it attempts to do so.

The adapter board of the present invention solves this problem. Generally speaking, the adapter board of the present invention provides an interface circuit that includes a first port for communicating with an IDE interface of a host computer, a second port for communicating with an IDE interface of a data storage device, and a control circuit that sends an invalid command rather than a selected IDE command to the second port in response to receiving the selected IDE command at the first port.

Figure 10A:
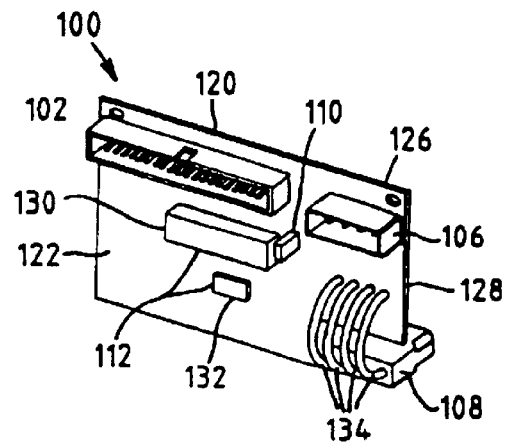
FIGS. 10A–10E are mechanical views of the adapter board of the present invention.
Figure 10B:
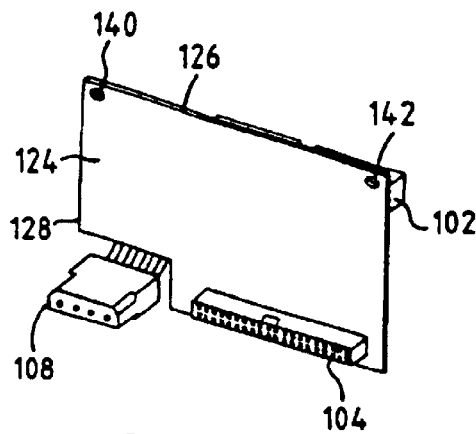
Figure 10C:
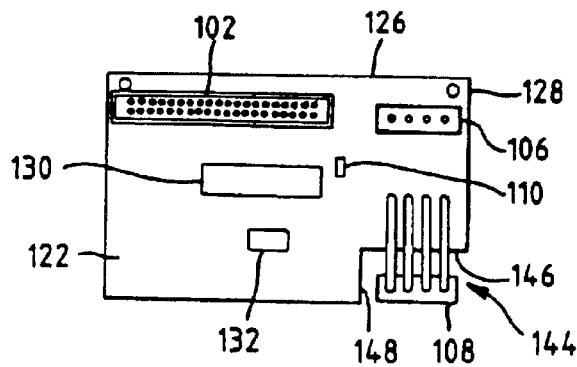
Figure 10D:
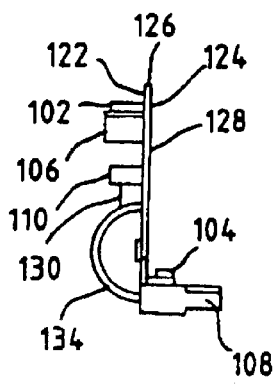
Figure 10E:
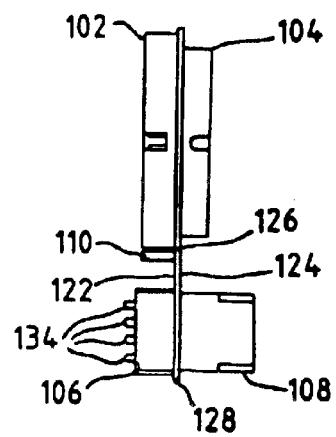
Figure 11D:
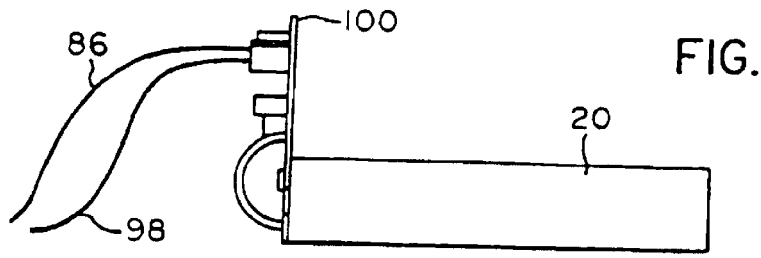
Figure 11E:
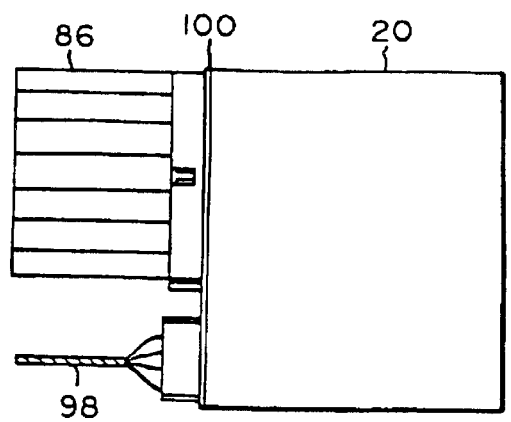

FIGS. 10A–10E provide mechanical views of adapter board 100 of the present invention. More particularly, FIG. 10A is a perspective view of a first major surface of adapter board 100, FIG. 10B is a perspective view of a second major surface of adapter board 100, FIG. 10C is a top plan view of the first major surface of adapter board 100, FIG. 10D is a side elevational view of adapter board 100, and FIG. 10E is a top view of adapter board 100.

Adapter board 100 includes IDE connectors 102 and 104, power connectors 106 and 108, jumper pins (not shown) that receive jumper 110 and control circuit 112. IDE connector 102 is a 40-pin male connector that mates with master connector 82 on IDE bus 24, and IDE connector 104 is a 40-pin female connector that mates with IDE connector 92 on hard disk drive 20. Power connector 106 is a 4-pin male connector that mates with connector 96 of power cable 98, and power connector 108 is a 4-pin female connector that mates with power connector 94 on hard disk drive 20. Power connectors 106 and 108 are directly connected to one another. Jumper 110 is a small piece of plastic that slides over and electrically connects the jumper pins thereby enabling the write-inhibit function. Control circuit 112 is operatively coupled between IDE connectors 102 and 104 and provides the write-inhibit function when jumper 110 is installed.

Adapter board 100 also includes a printed circuit board 120 with first major surface 122 and opposing second major surface 124. First major surface 122 faces IDE bus 24, and second major surface 124 faces hard disk drive 20 in the opposite direction. Sides (or edges) 126 and 128 are disposed between major surfaces 122 and 124 and are orthogonal to one another. Control device 112 includes programmable array logic (PAL) 130 and data switch 132. Power connector 108 is connected to printed circuit board 120 by four flexible C-shaped power leads 134. Holes 140 and 142 extend through major surfaces 122 and 124. Rectangular cut-out portion 144 includes side 146 parallel to side 126) and side 148 (parallel to side 128) that provide clearance for power connector 108.

As is seen, IDE connector 102, power connector 106, jumper 110, PAL 130, data switch 132 and power leads 134 extend from first major surface 122, and IDE connector 104 and power connector 108 extend from second major surface 124. IDE connector 102, power connector 106, the jumper pins (not shown), PAL 130, and data switch 132 are mounted on first major surface 122, IDE connector 104 is mounted on second major surface 124, jumper 110 is mounted on the jumper pins, and power connector 108 is mounted on the ends of power leads 134. In this manner, power connector 108 can be independently positioned with respect to IDE connector 104 to facilitate inserting and removing adapter board 100 from hard disk drive 20. PAL 130 is soldered to printed circuit board 120 to prevent field modification. For convenience of illustration, various resistors and capacitors mounted on major surface 122, and various interconnection wiring lines on major surfaces 122 and 124 are not shown.

Adapter board 100 has a width (along side 126) of 3.8 inches and a height (along side 128) of 2.5 inches. Rectangular cut-out portion 144 has a width (along side 146) of 1.13 inches and a height (along side 148) of 0.60 inches.

FIGS. 11A–11E are mechanical views, similar to FIGS. 10A–10E, respectively, showing adapter board 100 installed between hard disk drive 20 and IDE bus 24. As is seen, adapter board 100 is directly connected to hard disk drive 20 and IDE bus 24. Since IDE bus 24 includes ribbon cable 86, IDE bus 24 can easily extend to IDE connector 102 rather than to IDE connector 92 on hard disk drive 20. Likewise, power cable 98 can easily extend to power connector 106 rather than to power connector 94 on hard disk drive 20. Adapter board 100 has precisely the same width as hard disk drive 20 and is aligned width-wise with the vertical sides of hard disk drive 20. In addition, adapter board 100 requires relatively little space that is otherwise unused. Thus, adapter board 100 can be easily and conveniently installed between hard disk drive 20 and IDE bus 24.

If desired, a metal strap (not shown) can be mounted to adapter board 100 using holes 142 and 144, and the metal strap can also be mounted to rails (not shown) in gaming machine 2 that support hard disk drive 20. The metal strap can improve the mechanical attachment between adapter board 100 and hard disk drive 20 and reduce the likelihood that connectors 82 and 102 or connectors 96 and 106 become inadvertently separated from one another, for instance due to mechanical vibration or shock to gaming machine 2 by a frustrated game player.

During operation of gaming machine 2, adapter board 100 prevents CPU 10 from sending IDE commands 3xh, C5 h, CAh and CBh to hard disk drive 20 (where "x" designates any hexadecimal number). The inhibited IDE commands include the following write commands: write sector(s) (30h), CFA write sectors without erase (38h), write multiple (C5h), and write DMA (CAh). Although adapter board 100 inhibits other IDE commands as well (31h-37h, 39h-3Fh and CBh), these commands are not expected to be issued (see FIG. 6) and this simplifies the decoding logic in PAL 130. If adapter board 100 merely inhibited these write commands, hard disk drive 20 and IDE bus 24 might be left in a non-deterministic state requiring user intervention after CPU 10 issued any of these commands. Therefore, in addition to inhibiting these IDE write commands, adapter board 100 replaces these commands with reserved command 01h which is sent to hard disk drive 20 in their place. As seen in FIG. 6, IDE command code 01h is not explicitly listed, and therefore, is reserved. Thus, reserved command 01h (or IDE command code 01h) is an invalid command that is not understood by hard disk drive 20. As a result, hard disk drive 20 responds to reserved command 01h by generating an error message and no write operation is performed.

More particularly, when hard disk drive 20 receives reserved command 01h in its command register, hard disk drive 20 immediately determines that 01h is an invalid command, and in response to this determination, generates an interrupt by asserting line INTRQ, and generates an error message by setting ERR in the status register and ABRT in the error register. CPU 10 responds to the interrupt by reading the status register and detecting that ERR is set, and then responds to ERR being set by reading the error register and detecting that ABRT is set. In this fashion, CPU 10 is informed that the write operation has not occurred.

Figure 12:
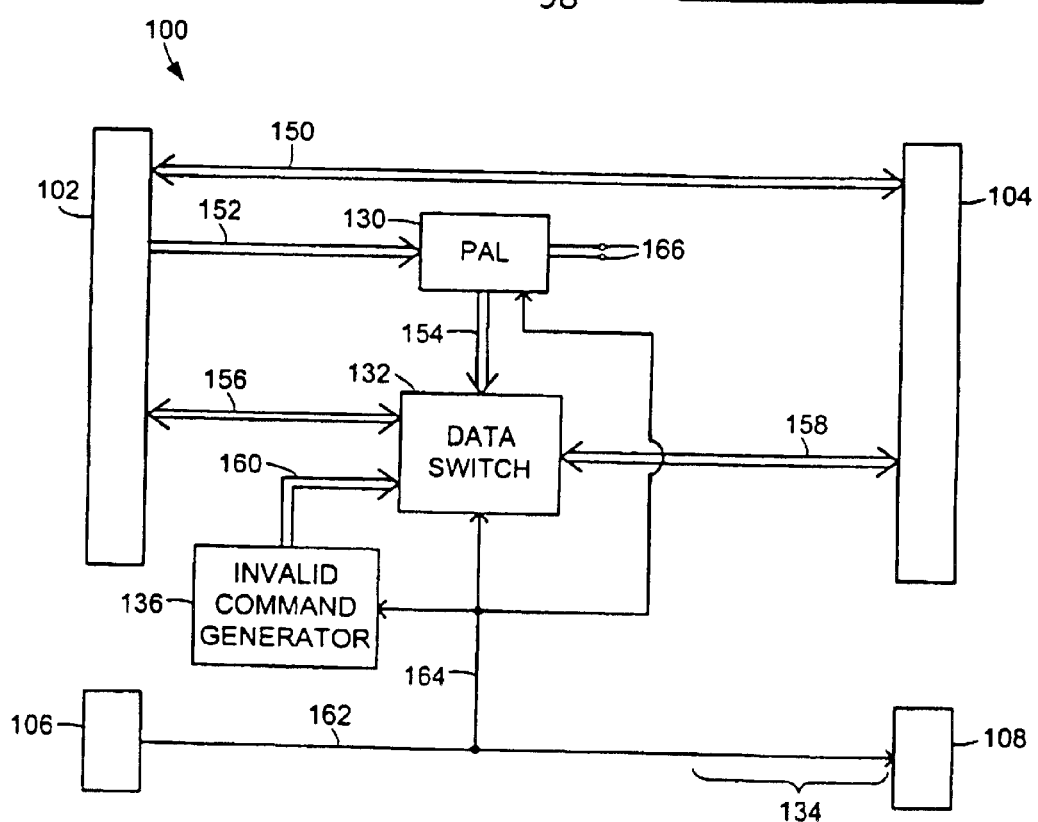
FIG. 12 is a block diagram of the adapter board of the present invention.

FIG. 12 is a block diagram of adapter board 100. Connectors 102 and 104 are connected to one another by central bus 150. PAL 130 is connected to connector 102 by control/data bus 152 and to data switch 132 by control bus 154. Data switch 132 is connected to connector 102 by data bus 156, to connector 104 by data bus 158, and to invalid command generator 136 by data bus 160. Connectors 106 and 108 are connected to one another by power bus 162, and PAL 130, data switch 132 and invalid command generator 136 are all connected to power bus 164 which is connected to power bus 162. PAL 130 is also connected to jumper pins 166 adapted to receive jumper 110.

Central bus 150 is a 32-line bidirectional bus that includes all the IDE signal lines except data bus bits 0–7 (DD0–DD7). Control/data bus 152 is a 15-line unidirectional bus that includes data bus bits 0–7 (DD0–DD7), chip selects 0 and 1 ($\overline{CS1FX}$, $\overline{CS3FX}$), address bits 0–2 (DA0–DA2), I/O write ($\overline{DIOW}$), and reset ($\overline{RESET}$). Control bus 154 is a 2-line unidirectional bus that includes two control bits ($\overline{1OE}$, $\overline{2OE}$). Data buses 156 and 158 are each an 8-line bidirectional bus that includes data bus bits 0–7 (DD0–DD7). Data bus 160 is an 8-line unidirectional bus that includes eight data bits (D0–D7). Thus, buses 150, 152, 156 and 158 transfer various IDE signals (see FIG. 5) to and/or from connector 102 and/or connector 104, whereas buses 154 and 160 transfer various control and data signals from PAL 130 and invalid command generator 136 to data switch 132. Power bus 162 is a 4-line bus that includes four power lines (+12V, ground, ground, +5V), and power bus 164 is a 2-line power bus that provides the third and fourth power lines (ground, +5V) from power bus 162.

Stated differently, printed circuit board 120 routes the lower eight data bus bits (DD0–DD7) on connector 102 to PAL 130 and to data switch 132, routes the chip selects ($\overline{CS1FX}$, $\overline{CS3FX}$), address bits (DA0–DA2), I/O write ($\overline{DIOW}$) and reset ($\overline{RESET}$) on connector 102 to PAL 130, routes all 40 IDE signal lines on connector 102 except for the lower eight data bus bits (DD0–DD7) to connector 104, and routes the lower eight data bus bits (DD0–DD7) on connector 104 to data switch 132. Printed circuit board 120 also routes the four power lines on connector 106 to connector 108 and routes two of these power lines (ground and +5V) to PAL 130, data switch 132 and invalid command generator 136. Power leads 134 constitute the portion of power bus 162 connected to connector 108. In addition, printed circuit board 120 routes various control and data signals from PAL 130 and invalid command generator 136 to data switch 132.

PAL 130 senses the presence or absence of jumper 110 on jumper pins 166 at power-up. If jumper 110 is present at power-up than the write-inhibit function is enabled, whereas if jumper 110 is absent at power-up than the write-inhibit function is disabled. After power is applied, PAL 130 remains in the mode set at power-up regardless of whether jumper 110 is subsequently removed or installed until power is removed and re-applied, at which time the presence or absence of jumper 110 is re-evaluated to determine whether the write-inhibit function is enabled or disabled. Thus, the existence of jumper 110 is latched only during a hard reset in response to the reset signal ($\overline{RESET}$).

When the write-inhibit function is enabled (i.e., jumper 110 is installed at power-up), PAL 130 selectively controls data switch 132 to route the reserved command (01h), rather than the inhibited IDE commands (3xh, C5h, CAh, CBh), to connector 104.

Data switch 132 serves to couple either data bus 156 or data bus 160 to data bus 158. PAL 130 controls the operation of data switch 132 via the two control lines on control bus 154. When PAL 130 asserts the first control line ($\overline{1OE}$), data switch 132 couples data bus 156 to data bus 158. As a result, all 40 IDE signal lines are bidirectionally coupled between connectors 102 and 104 via buses 150, 156 and 158, and adapter board 100 is essentially transparent with respect to the IDE communications between hard disk drive 20 and IDE bus 24. That is, adapter board 100 has essentially no effect on the IDE interface, and the IDE communications between hard disk drive 20 and IDE bus 24 are essentially the same as if connector 82 was plugged into connector 92 (see FIG. 4). On the other hand, when PAL 130 asserts the second control line ($\overline{2OE}$), data switch 132 couples data bus 160 to data bus 158. Invalid command generator 136 sets the 8 data lines (D0–D7) of data bus 160 to 01h, which provides the reserved command used to replace the inhibited IDE commands.

Thus, PAL 130 asserts the first control line and deasserts the second control line to permit normal IDE operations; however, when PAL 130 expects an IDE command it evaluates whether the incoming IDE command should be inhibited. If so, PAL 130 asserts the second control line so that data switch 132 couples reserved command 01h to bus 158, otherwise PAL 130 asserts the first control line so that data switch 132 couples the non-inhibited IDE command to bus 158.

Figure 13:
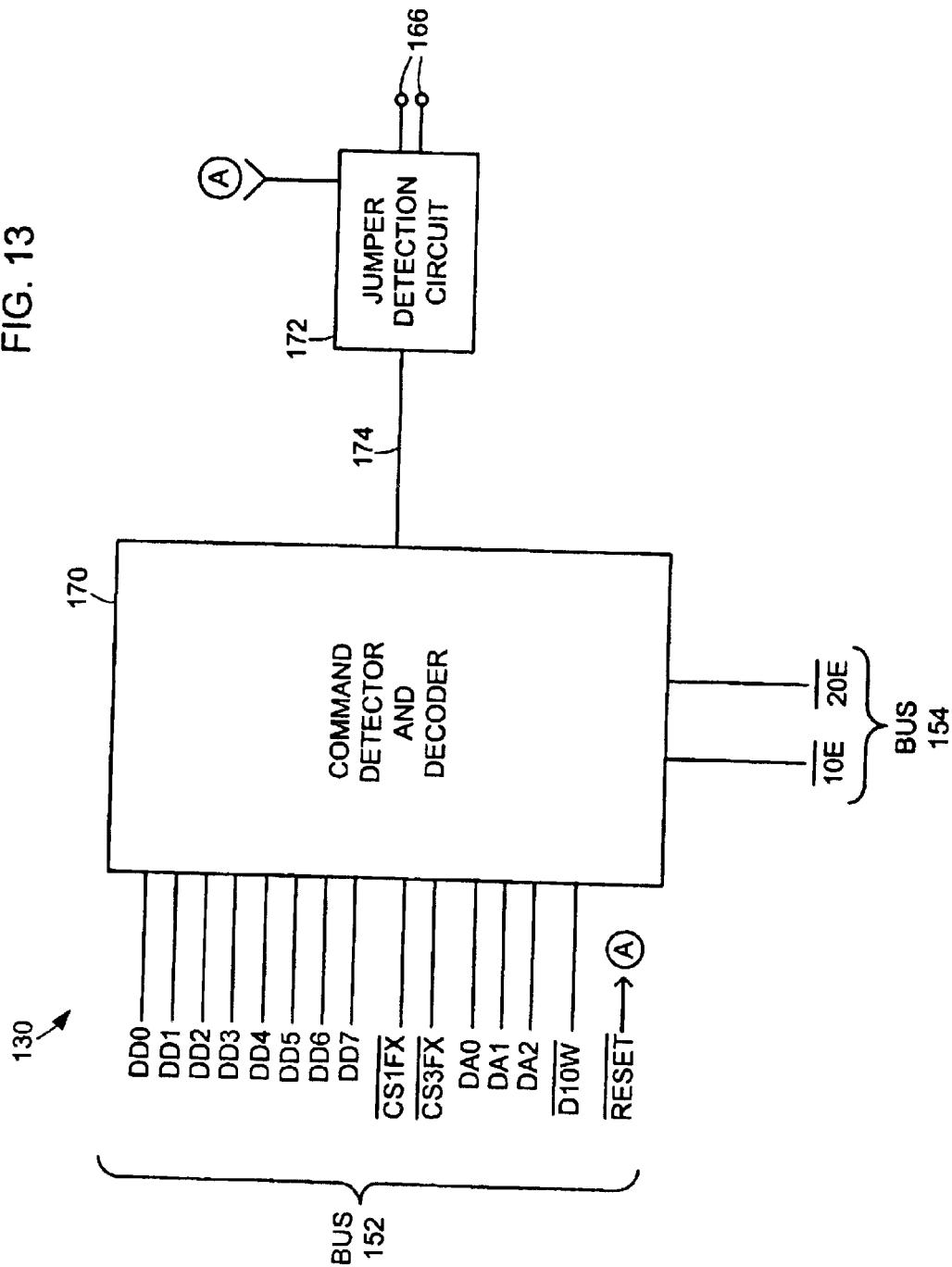
FIG. 13 is a block diagram of the programmable array logic in FIG. 12.

FIG. 13 is a block diagram of PAL 130. PAL 130 includes command detector and decoder 170 and jumper detection circuit 172. Command detector and decoder. 170 includes detection logic that determines when an IDE command is expected and decoding logic that determines whether the IDE command is one of the inhibited commands. Jumper detection circuit 172 determines at power-up, as indicated by the reset signal ($\overline{RESET}$), whether or not jumper 110 is installed at jumper pins 166 and communicates this status to command detector and decoder 170 along line 174. If so, command detector and decoder 170 enables the write-inhibit function, if not, it disables the write-inhibit function.

When the write-inhibit function is enabled, command detector and decoder 170 usually asserts the first control line ($\overline{1OE}$) and deasserts the second control signal ($\overline{2OE}$) so that data switch 132 couples bus 156 to bus 158. However, when the detection logic determines that chip select 0 ($\overline{CS1FX}$), address bits 0–2 (DA0–DA2) and I/O write ($\overline{DIOW}$) are asserted and chip select 1 ($\overline{CS3FX}$) is deasserted, the detection logic acknowledges that CPU 10 has selected to write to the command register (see FIG. 7) and will soon be issuing the command along the lower eight data bus bits (DD0–DD7). When the command arrives, the decoder logic determines whether the command is one of the inhibited commands (3xh, C5h, CAh, CBh). If so, command detector and decoder 170 immediately asserts the second control line ($\overline{2OE}$) and deasserts the first control line ($\overline{1OE}$) so that data switch 132 routes the invalid command 01h from data bus 160 to data bus 158, and then asserts the first control line ($\overline{1OE}$) and deasserts the second control line ($\overline{2OE}$) once the detector logic determines that CPU 10 has released the data bus bits (DD0–DD7) so that normal IDE communications may resume. Otherwise, if the decoder logic determines that the command is not one of the inhibited commands, command detector and decoder 170 continues to assert the first control line ($\overline{1OE}$) and deassert the second control line ($\overline{2OE}$) so that data switch 132 routes the non-inhibited command from data bus 156 to data bus 158.

Figure 14:
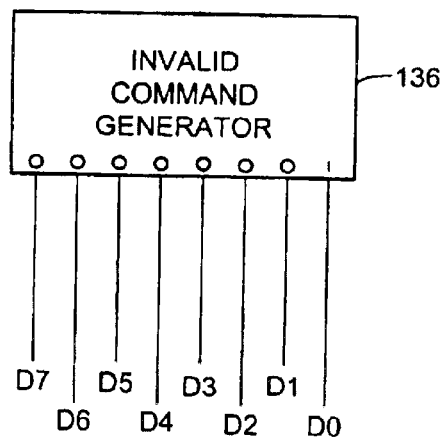
FIG. 14 is a block diagram of the invalid command generator in FIG. 12.

FIG. 14 is a block diagram of invalid command generator 136. Invalid command generator 136 provides reserved command 01h at data lines D0–D7. That is, data line D0 is set to one and data lines D1–D7 are set to zero.

Figure 15:
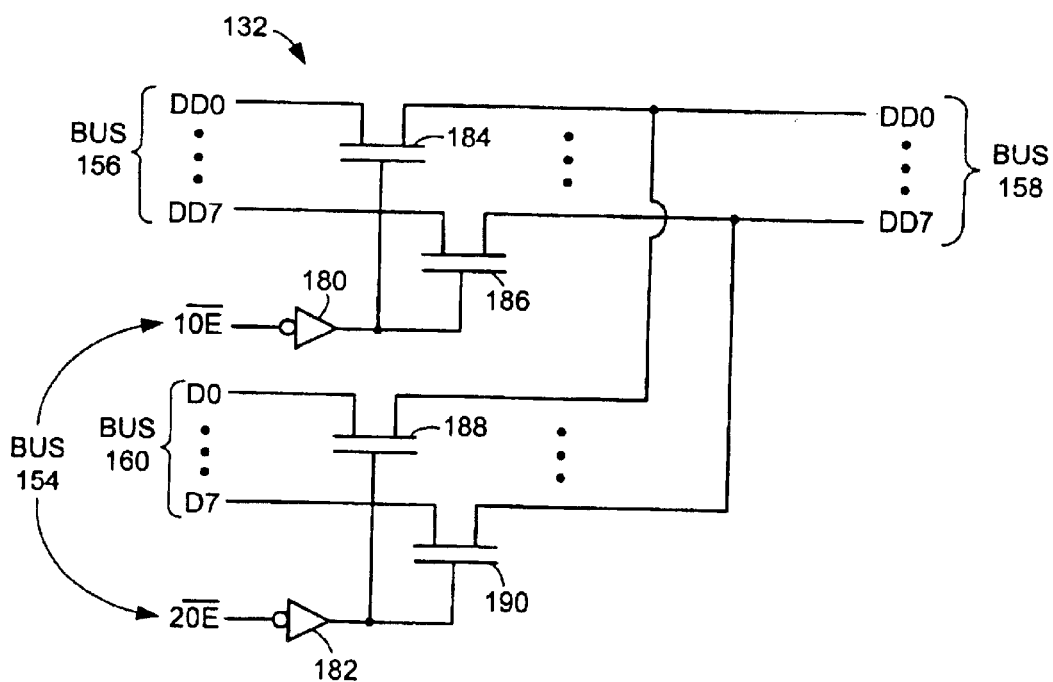
FIG. 15 is a circuit diagram of the data switch in FIG. 12.

FIG. 15 is a circuit diagram of data switch 132. Data switch 132 includes inverters 180 and 182 and transistors 184, 186, 188 and 190. For convenience of illustration, control lines ($\overline{1OE}$) and ($\overline{2OE}$) on bus 154, data bus bits DD0 and DD7 on buses 156 and 158, and data lines D0 and D7 on bus 160 are shown, whereas data bus bits DD1–DD6 on buses 156 and 158, data lines D1–D6 on bus 160 and the associated twelve transistors are omitted.

Transistors 184, 186, 188 and 190 are each N-channel metal-oxide-semiconductor field-effect transistors (MOSFETs). Therefore, for each transistor, when a one (or high signal) is applied to its gate (or input terminal) a conductive path occurs between its source and drain (or output terminals); likewise, when a zero (or low signal) is applied to its gate a high-impedance path occurs between its source and drain.

As is seen, the input of inverter 180 is connected to the first control line ($\overline{1OE}$), the output of inverter 180 is connected to the gates of transistors 184 and 186, the source and drain of transistor 184 are connected between data bus bits DD0 of buses 156 and 158, and the source and drain of transistor 186 are connected between data bus bits DD7 of buses 156 and 158. Similarly, the input of inverter 182 is connected to the second control line ($\overline{2OE}$), the output of inverter 182 is connected to the gates of transistors 188 and 190, the source and drain of transistor 188 are connected between data line D0 of bus 160 and data bus bit DD0 of bus 158, and the source and drain of transistor 190 are connected between data line D7 of bus 160 and data bus bit DD7 of bus 158.

When the first control line ($\overline{1OE}$) is asserted (low), inverter 180 provides a high signal to the gates of transistors 184 and 186, thereby tuning on transistors 184 and 186 and coupling data bus bits DD0 and DD7 of buses 156 and 158 (data bus bits DD1–DD6 of buses 156 and 158 are similarly coupled). When the first control line ($\overline{1OE}$) is deasserted (high), inverter 180 provides a low signal to the gates of transistors 184 and 186, thereby turning off transistors 184 and 186 and decoupling data bus bits DD0 and DD7 of buses 156 and 158 (data bus bits DD1–DD6 of buses 156 and 158 are similarly decoupled). The assertion and deassertion of the second control line ($\overline{2OE}$) serves to couple and decouple data lines D0–D7 on bus 160 to and from data bus bits DD0–DD7 on bus 158 in the same manner.

Figure 16:
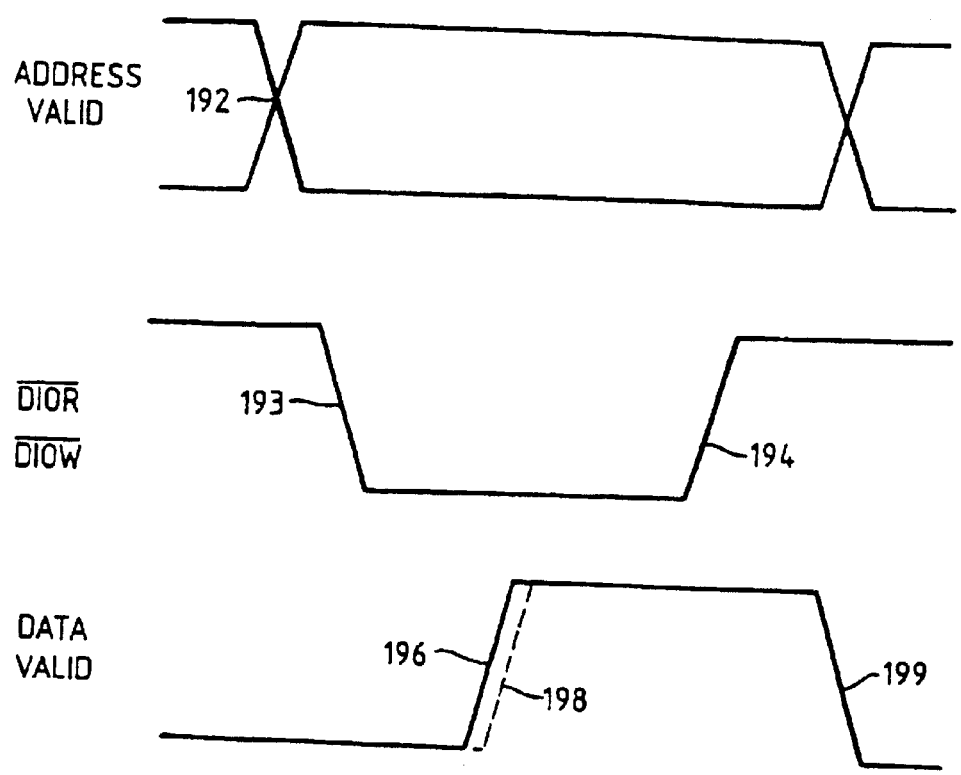
FIG. 16 is a simplified timing diagram of programmed I/O operations using the adapter board of the present invention.

FIG. 16 is a simplified timing diagram of programmed I/O operations using adapter board 100. Accesses by CPU 10 to the IDE command register block (see FIG. 7) in hard disk drive 20 are executed via programmed I/O. This includes the reading of status information from the status register, the reading of error information from the error register, the setting of parameters in various registers in the command register block, and the writing of commands to the command register in the command register block.

For a programmed I/O data transfer, CPU 10 first puts the address on the address lines as depicted by address valid at time 192. The address consists of the chip selects ($\overline{CS1FX}$, $\overline{CS3FX}$) and address bits (DA0–DA2). Shortly thereafter, CPU 10 asserts the I/O write signal ($\overline{DIOW}$) for write access or the I/O read signal ($\overline{DIOR}$) for read access at time 193. For a write access, CPU 10 places the data on the data bus bits, for a read access, CPU 10 reads data placed on the data bus bits by hard disk drive 20. The data must be valid at the time the I/O write signal ($\overline{\text{DIOW}}$) (in the case of a write) or the I/O read signal ($\overline{\text{DIOR}}$) (in the case of a read) is deasserted at time 194. In other words, during a write, hard disk drive 20 recognizes whatever data is on the data bus bits when the I/O write signal ($\overline{\text{DIOW}}$) is deasserted, and during a read, CPU 10 recognizes whatever data is on the data bus bits when the I/O read signal ($\overline{\text{DIOR}}$) is deasserted. Shortly thereafter, the address and data lines are released at time 199 and the cycle is complete.

When programmed I/O occurs other than when CPU 10 attempts to write an inhibited command to the command register and the write-inhibit function is enabled, adapter board 100 has essentially no effect on the operation. The delay introduced by transistors 84, 86, 88 and 90 is negligible, and the data is written to or read from hard disk drive 20 when the I/O write signal ($\overline{\text{DIOW}}$) or the I/O read signal ($\overline{\text{DIOR}}$) is deasserted at time 194.

When programmed I/O occurs and CPU 10 attempts to write an inhibited command to the command register and the write-inhibit function is enabled, the inhibited command is provided by CPU 10 at time 196 and travels through data switch 132 and across bus 158 to hard disk drive 20. At the same time, PAL 130 receives the inhibited command, determines that it is an inhibited command, and in response to this determination deasserts the first control line ($1\overline{\text{OE}}$) and asserts the second control line ($2\overline{\text{OE}}$). Data switch 132 responds to the deassertion of the first control line ($1\overline{\text{OE}}$) and the assertion of the second control line ($2\overline{\text{OE}}$) by decoupling bus 156 from bus 158 and coupling bus 160 to bus 158, thereby providing the reserved command 01h rather than the inhibited command to hard disk drive 20 at time 198. PAL 130 and data switch 132 are high-speed devices that rapidly perform these functions long before the I/O write signal ($\overline{\text{DIOW}}$) is deasserted at time 194. Therefore, although the inhibited command is applied to hard disk drive 20 at time 196, the reserved command 01h replaces the inhibited command at time 198. Between times 196 and 198, PAL 130 and data switch 132 determine that the inhibited command has been issued and replace it with the reserved command 01 h. The delay between times 196 and 198 is approximately 3 nanoseconds. Thus, the invalid command 01h replaces the inhibited command long before the I/O write signal ($\overline{\text{DIOW}}$) is deasserted, and when the I/O write signal ($\overline{\text{DIOW}}$) is deasserted, the invalid command 01h rather than the inhibited command is written into the command register in hard disk drive 20. Thereafter, when CPU 10 releases the address and data at time 199, PAL 130 asserts the first control line ($1\overline{\text{OE}}$) and deasserts the second control line ($2\overline{\text{OE}}$), and in response to the control lines changing states, data switch 132 couples bus 156 to bus 158 and decouples bus 160 from bus 158, thereby restoring normal IDE communications between CPU 10 and hard disk drive 20.

It is critical to note that hard disk drive 20 does not recognize or understand that the inhibited command was placed on data bus 158. Hard disk drive 20 merely latches the contents of bus 158 when the I/O write signal ($\overline{\text{DIOW}}$) is deasserted.

Therefore, it is understood that in the context of the present invention, the inhibited command is prevented or inhibited from reaching the IDE data storage device, and therefore is never sent to or received by the IDE data storage device, when the inhibited command is replaced by an invalid command before the IDE data storage device can recognize the inhibited command, even if the inhibited command has been applied to the IDE port of the IDE data storage device. In other words, although the inhibited command may be briefly applied to the IDE port of the data storage device, it is effectively meaningless noise that is never latched in, the command register of the data storage device and has no affect on the data storage device.

Figure 17:
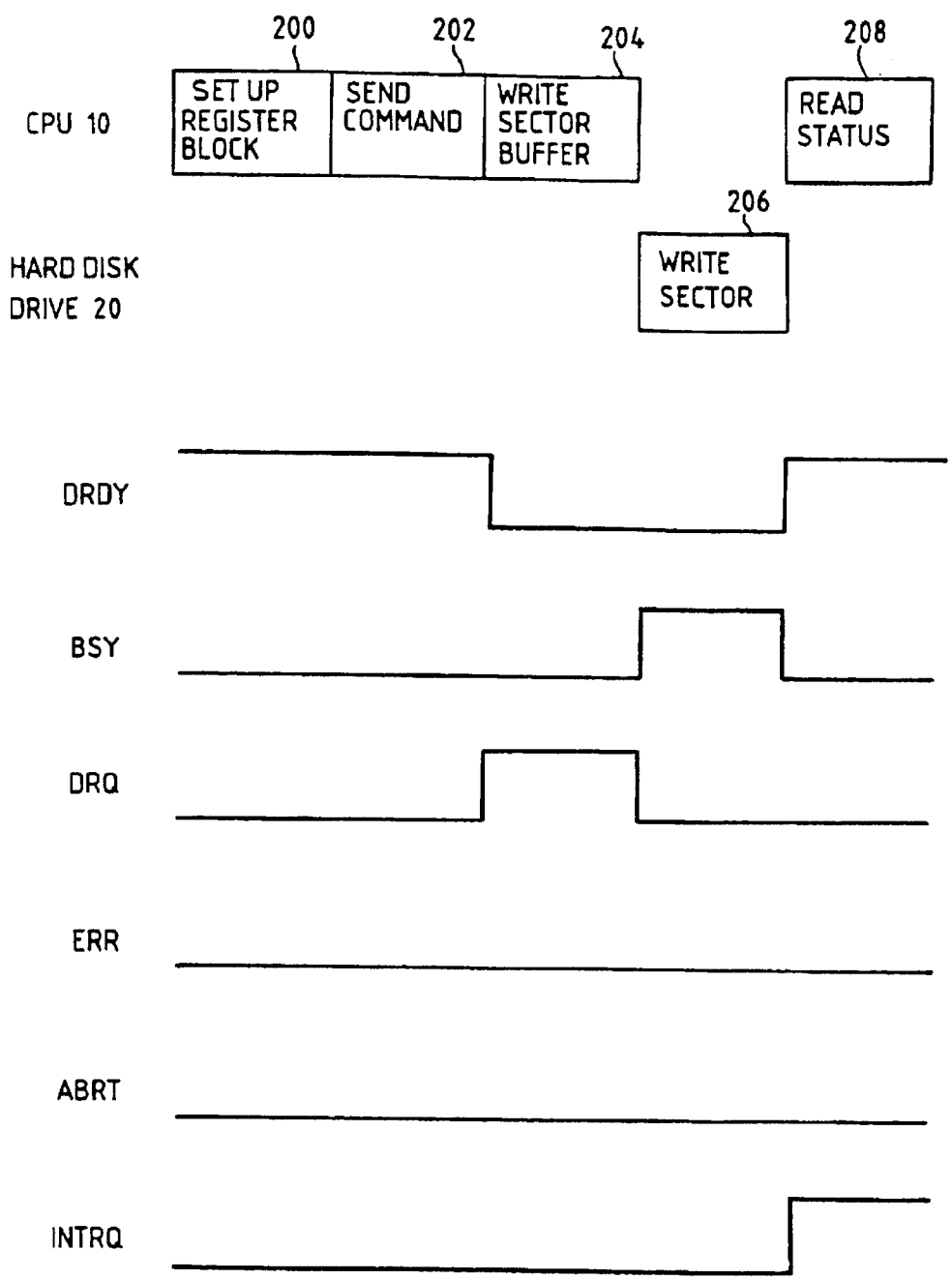
FIG. 17 is a simplified timing diagram of a write operation using the adapter board of the present invention when the write-inhibit function is disabled.

FIG. 17 is a simplified timing diagram of a write operation using adapter board 100 when the write-inhibit function is disabled. Generally speaking, the programming and execution of the commands for an IDE interface proceeds in three phases: (1) the command phase in which the CPU prepares the parameter registers and passes the command code to start the execution; (2) the data phase in which for commands involving disk access the drive positions the read/write heads and eventually transfers the data between the disk and the CPU, and (3) the result phase in which the drive provides status information for the executed command in the corresponding registers and generates an interrupt request (INTRQ).

More particularly, FIG. 17 illustrates the conventional implementation of the write sector(s) command (30h) for a single sector when the write-inhibit function is disabled. CPU 10 first writes any required parameters to the address and feature registers (step 200). In addition, CPU 10 reads the drive ready bit (DRDY) in the status register to confirm that hard disk drive 20 is ready to accept a command. If the drive ready bit (DRDY) is set, CPU 10 next writes the write sector(s) command to the command register (step 202). In response to receiving the write sector(s) command in the command register, hard disk drive 20 clears the drive ready bit (DRDY) and sets the data request bit (DRQ) in the status register thereby signaling that it is waiting to receive data, CPU 10 reads the status register and in response to the data request bit (DRQ) writes 512 bytes of data to the sector buffer in hard disk drive 20 (step 204). Once the sector buffer is full, hard disk drive 20 clears the data request bit (DRQ) and sets the busy bit (BSY) in the status register thereby signaling that CPU 10 may not access any other registers in the command register block (step 206). As soon as the data in the sector buffer has been fully written to the disk, hard disk drive 20 clears the busy bit (BSY, sets the drive ready bit (DRDY) and generates an interrupt request (INTRQ). In response to the interrupt request, CPU 10 reads the status register (step 208). Since an error in the execution of the write sector(s) command did not occur, the error bit ERR) in the status register and the aborted command bit (ABRT) in the error register remain cleared.

FIG. 18 is a simplified timing diagram of an attempted write operation using adapter board 100 when the write-inhibit function is enabled. In this instance, the programming never gets past the command phase since hard disk drive 20 responds to the invalid command from adapter board 100 by generating an interrupt request.

More particularly, FIG. 18 illustrates the attempted implementation of the write sector(s) command (30h) for a single sector when the write-inhibit function is enabled. CPU 10 first writes any required parameters to the address and feature registers (step 210) and reads the drive ready bit (DRDY) in the status register to confirm that hard disk drive 20 is ready to accept a command. If the drive ready bit (DRDY) is set, CPU 10 next attempts to write the write sector(s) command to the command register. However, adapter board 100 recognizes the write sector(s) command as one of the inhibited commands and therefore replaces it with the reserved command 01h (step 212). In response to receiving the reserved command 01h, hard disk drive 20 sets the error bit (ERR) in the status register, sets the aborted command bit (ABRT) in the error register, and generates an interrupt request (INTRQ). In response to the interrupt request, CPU 10 reads the status register, determines that an error has occurred, reads the error register, and determines that the write sector(s) command was aborted (step 214).

Figure 19:
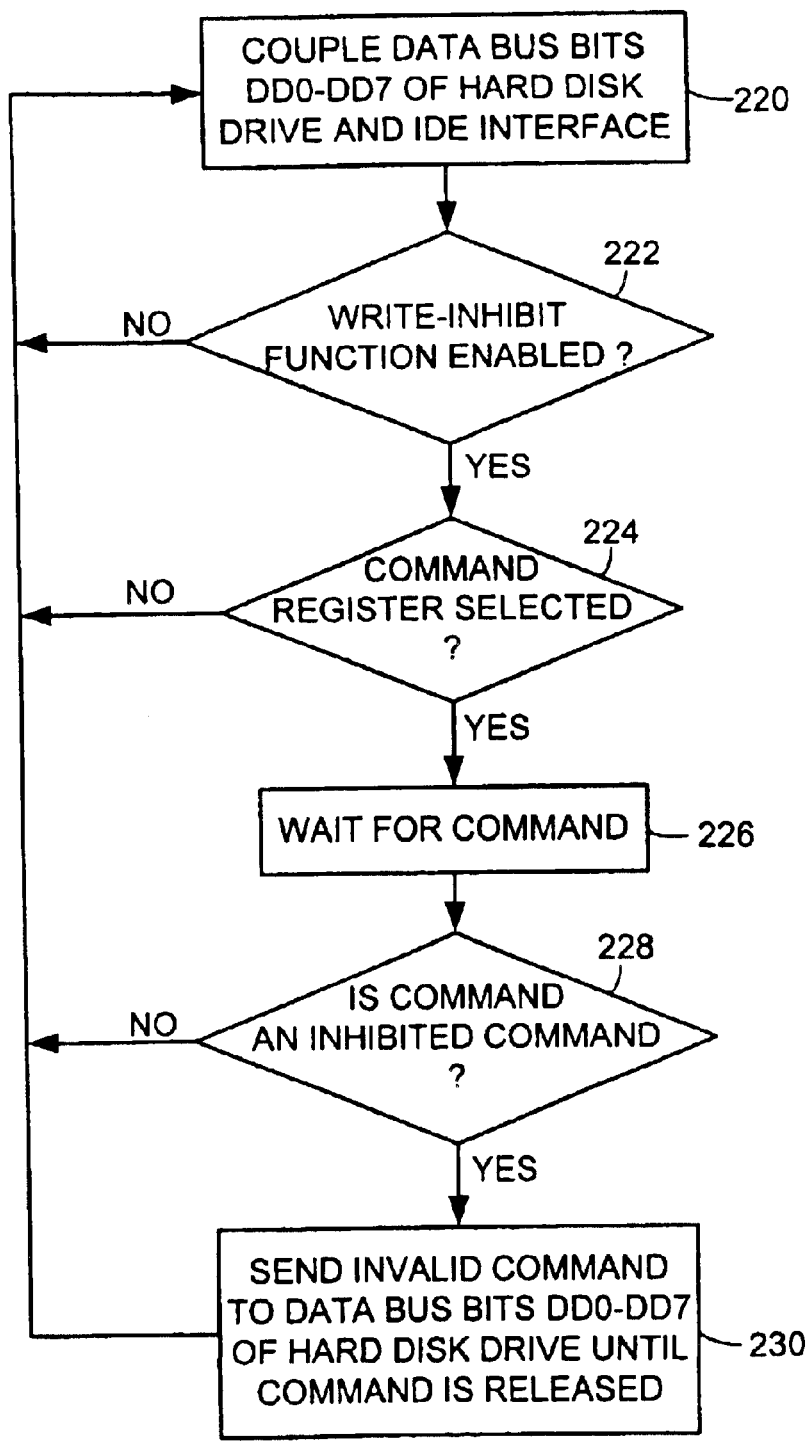
FIG. 19 is a flow chart illustrating the operation of the adapter board of the present invention.

FIG. 19 is a flow chart illustrating the operation of adapter board 100. PAL 130 initially instructs data switch 132 to couple the lower eight data bus bits of hard disk drive 20 and IDE interface 24 (step 220). If PAL 130 determines at power-up that jumper 110 is absent then PAL 130 remains latched in this mode and the write-inhibit function is disabled (step 222). On the other hand, if PAL 130 determines at power-up that jumper 110 is present then PAL 130 detects whether CPU 10 is attempting to write to the command register in hard disk drive 20 (step 224). If so, PAL 130 waits for the command (step 226). When PAL 130 receives the command, PAL 130 determines whether the command is one of the inhibited commands (step 228). If so, PAL 130 instructs data switch 132 to route the invalid command to hard disk drive 20 until CPU 10 releases the command (step 230), at which time PAL 130 instructs data switch 132 to couple the lower eight data bus bits of hard disk drive 20 and IDE interface 24 and decouple the invalid command from the lower eight data bus bits of hard disk drive 20. Otherwise, if the command is not one of the inhibited commands, PAL 130 instructs data switch 132 to route the command to hard disk drive 20.

If desired, CPU 10 can periodically issue the inhibited commands to confirm that adapter board 100 has been installed and is enabled and functioning properly. For instance, CPU 10 can periodically issue the write sector(s) command in an attempt to change the data stored at a selected sector in hard disk drive 20 and then read the sector to determine whether the data has been changed. In this manner, CPU 10 can determine whether the write sector(s) command was executed or inhibited. In the event the command was executed, CPU 10 can halt operation of gaming machine 2.

Figure 20A:
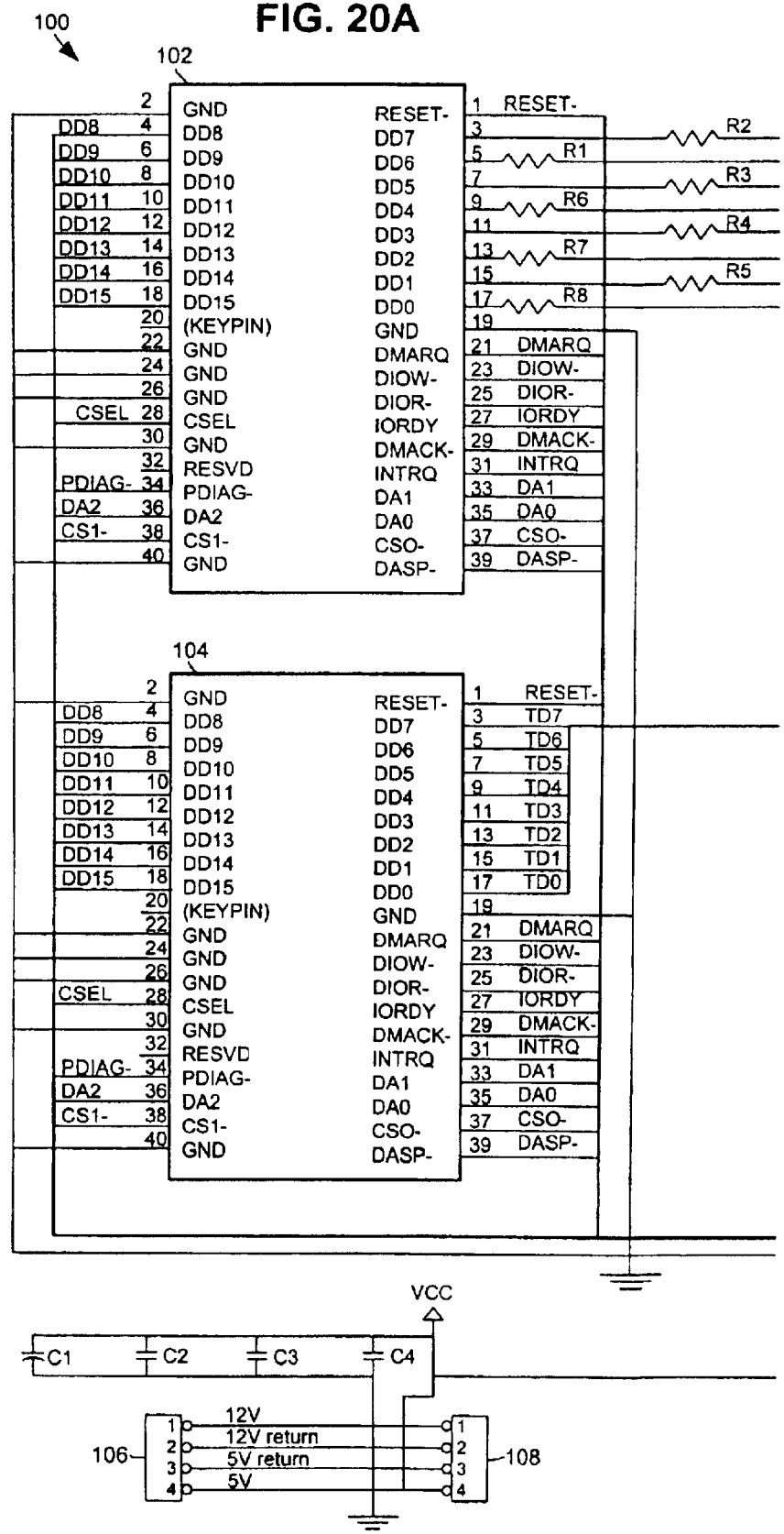
FIG. 20 is a schematic diagram of an implementation of the adapter board of the present invention.
Figure 20B:
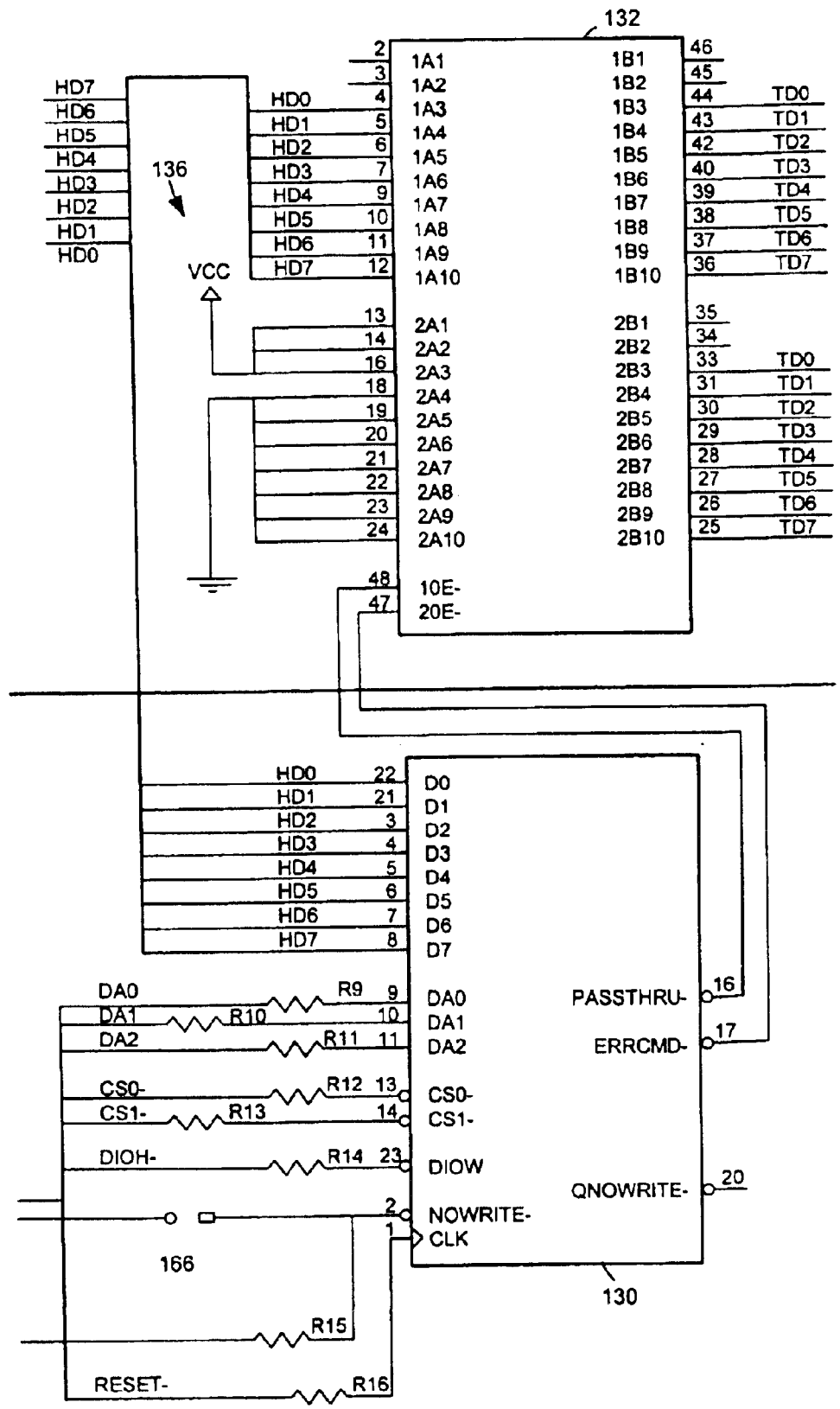

FIG. 20 is a schematic diagram of an implementation of adapter board 100 which Applicant has constructed. For convenience of illustration, the signals that are active low are indicated with a trailing dash (-) instead of a bar over the name. Furthermore, although some of the signal or terminal names may differ from those previously used, the correspondence will be apparent to those skilled in the art. For instance, chip selects 0 and 1 at pins 37 and 38, respectively, are labeled CS0- and CS1-, respectively, and obviously correspond to $\overline{CS1FX}$ and $\overline{CS3FX}$, respectively. Furthermore, since CPU 10 provides programmed I/O modes that do not use the 16 bit I/O signal ($\overline{IOCS16}$), pin 32 on connectors 102 and 104 is labeled resvd and is not coupled between connectors 102 and 104. That is, since no communications occur along line 32 of IDE bus 24, it is not necessary for bus 150 between connectors 102 and 104 to include this line.

Capacitors C1–C4 provide noise immunity for PAL 130 and data switch 132, and resistors R1–R16 serve to limit current. PAL 130 asserts the signal at the passthru- terminal (16) to instruct data switch 132 at the 1OE- terminal (48) to couple the first input port (1A3–1A10) to the first output port (1B3–1B10). Likewise, PAL 130 asserts the signal at the errcmd- terminal (17) to instruct data switch 132 at the 2OE- terminal (47) to couple the second input port (2A3–2A10) to the second output port (2B3–2B10). As is seen, the first input port is coupled to the data bus bits of connector 102, the second input port is coupled to invalid command generator 136 (i.e., 01h), and the first and second output ports are tied together and coupled to the data bus bits (DD0–DD7) of connector 104.

PAL 130 also generates a signal at the qnowrite- terminal (20) that indicates whether the write-inhibit function is enabled or disabled. If the write-inhibit function is enabled then qnowrite- is low, whereas if the write-inhibit function is disabled then qnowrite- is high. The qnowrite- terminal permits adapter board 100 to communicate the status of the write-inhibit function to the external environment. For instance, an LED can be coupled to qnowrite- that turns on when the write-inhibit function is disabled thereby generating a warning signal to the external environment.

The components of adapter bad 100 in FIG. 20 are as follows:

| Component | Description |
| --- | --- |
| Connector 102 | Molex 15-80-0403 |
| Connector 104 | 3M 8540-4500JL |
| Connector 106 | Molex 15-24-4157 |
| Connector 108 | Molex 15-24-3031 |
| PAL 130 | Lattice GAL22V10D-25LP |
| Data Switch 132 | Texas Instruments SN74CBTD16210DGGR |
| Capacitor C1 | 22 microfarads |
| Capacitor C2 | 0.01 microfarads |
| Capacitors C3, C4 | 0.1 microfarads |
| Resistors R1–R14 and R16 | 22 ohms |
| Resistor R15 | 10 kilohms |

FIG. 21 is a logic diagram of PAL 130 in FIG. 20. The structure and operation of PAL 130 in FIG. 20 may be completely understood with reference to this diagram. For instance, AND gate 240 detects the presence of x5h commands, AND gate 242 detects the presence of xAh or xBh commands, AND gate 244 detects the presence of Cxh commands, and AND gate 246 detects the presence of 3xh commands. Accordingly, AND gate 250 detects the presence of the C5h command, and AND gate 252 detects the presence of the CAh and CBh commands. Thus, OR gate 254 detects the presence of the 3xh, C5h, CAh and CBh commands which, as mentioned above, are the inhibited commands. AND gates 256 and 258 detect whether CPU 10 is attempting to write to the command register in hard disk drive 20. Accordingly, AND gate 260 determines whether CPU 10 is attempting to write one of the inhibited commands to the command register. If so, AND gate 260 asserts a high signal al its output, which is inverted by inverter 262 so the errcmd- is low (asserted) while passthru- is high (deasserted). Likewise, if CPU 10 is not attempting to write one of the inhibited commands to the command register, AND gate 260 asserts a low signal at its output, which is inverted by inverter 262 so that errcmd- is high (deasserted) while passthu- is low (asserted). Finally, AND gates 264, 266 and 268 in combination with OR gate 270 provide the jumper detection circuit 272 which determines whether jumper 110 is installed at jumper terminals 166 during power-up. If jumper 110 is not installed, the output of OR gate 270 is high which causes qnowrite- to go high (deasserted), errcmd- to go high (deasserted) and passthru- to go low (asserted).

Those skilled in the art will recognize other logic descriptions useful in particular applications which may be programmed into PAL 130.

The present invention is particularly well-suited for use in gaming machines such as a card games (e.g., poker and black jack), slot games (e.g., three reel single or multi-line) and roulette games, although the invention can also be used in set-top boxes, set-back boxes, retail kiosks and other devices in which it is desirable to inhibit a host computer from sending a selected command to an IDE data storage device. The present invention is also particularly well-suited for preventing a selected command from reaching an IDE hard disk drive, although the invention can be used with other IDE data storage devices such as solid state (or flash) disk drives, CD-ROM drives and tape drives. Likewise, the present invention is particularly well-suited for inhibiting a write command from reaching an IDE data storage device, although the invention can be used to inhibit any selected IDE command from reaching the IDE data storage device. For instance, in addition to or as an alternative to inhibiting the IDE write commands, the present invention can be used to inhibit the media lock (DEh), media unlock (DFh), sleep (E6h), standby (E0h, E2h), download microcode (92h) and/or packet (A0h) commands, among others.

The present invention may include numerous other variations. For instance, the jumper pins can be replaced by another type of user-accessible mechanical switch, such as a dual-in-line package switch, or alternatively the jumper pins can be eliminated such that the write-inhibit function is permanently enabled. The adapter board can recognize the presence or absence of the jumper only at power-up, or alternatively the adapter board can recognize the presence or absence of the jumper whenever power is applied. Multiple jumpers can be used to enable and disable inhibiting multiple IDE commands. The invalid command which replaces the inhibited IDE commands need not be limited to reserved command 01h, and can be implemented with other reserved commands, retired commands, obsolete commands, or other commands that cause the IDE data storage device to generate an error message.

The present invention can also be used for IDE buses that employ master and slave data storage devices. For instance, if it desired to write-inhibit only one of these devices, then the adapter board can be connected between the one device and the associated connector of the IDE bus. If it is desired to write-inhibit both devices, then the adapter board can be connected between the host computer and the system connector (e.g., connector 80) of the IDE bus.

The present invention is also well-suited for IDE buses of all shapes and sizes. For instance, the present invention can be used with a 40-pin IDE bus, a 44-pin IDE bus that includes the 40 pins on IDE bus 24 and the four power and ground lines on power cable 98, a 64-pin PCMCIA bus that includes the 40 pins on IDE bus 24 and 24 other pins, and other types of IDE buses. Likewise, if the host computer does not utilize a line (such as line 32) on the IDE bus, the present invention can couple or decouple that line between the host computer and the IDE data storage device as a matter of design choice.

The present invention can also be implemented so that the inhibited command is never applied at any time to the IDE port of the data storage device, for instance by decoupling the lower eight data bus bits of the IDE bus from the IDE port of the data storage device when an IDE command is expected, and then coupling either the IDE command or the invalid command to the IDE port of the data storage device depending on whether the IDE command is an inhibited command.

Moreover, the best presently known mode of implementation of the present invention depends upon numerous factors, including limitations and requirements of the operating system, hardware design complexity versus cost tradeoffs, software complexity versus cost tradeoffs, performance considerations, and other factors.

Those skilled in the art will readily implement the steps necessary to provide the structures and methods disclosed herein, and will understand that the process parameters, materials, dimensions, and sequence of steps are given by way of example only and can be varied to achieve the desired result as well as modifications which are within the scope of the invention. Variations and modifications of the embodiments disclosed herein may be made based on the description set forth herein, without departing from the spirit and scope of the invention as set forth in the following claims.

What is claimed is:

1. A method for inhibiting commands sent from a computer to a data storage device, the method comprising:
    determining whether an Integrated Drive Electronics (IDE) command at a first bus coupled to the host computer is from a first set of IDE commands; and
    if the IDE command at the first bus is from the first set of IDE commands, generating signals indicative of a command from a second set of IDE commands on a second bus coupled to the data storage device while an input/output write signal to the data storage device is deasserted;
    wherein the command from the second set of IDE commands is different than the IDE command at the first bus.

2. A method according to claim 1, further comprising if the IDE command at the first bus is not from the first set of IDE commands, generating signals indicative of the IDE command at the first bus on the second bus while the input/output write signal to the data storage device is deasserted.

3. A method according to claim 2, wherein generating signals indicative of the IDE command at the first bus on the second bus comprises coupling at least a portion of the first bus to the second bus.

4. A method according to claim 1, wherein generating signals indicative of the IDE command on the second bus comprises coupling an output of a command generator to the second bus.

5. A method according to claim 1, wherein the first set of commands comprises only one command.

6. A method according to claim 5, wherein the first set of commands comprises a write command.

7. A method according to claim 1, wherein the first set of commands comprises a plurality of commands.

8. A method according to claim 7, wherein the first set of commands comprises at least two of a write command, a media lock command, a media unlock command, a sleep command, a standby command, a download microcode command, and a packet command.

9. A method according to claim 1, wherein each command from the second set of commands, when received by the data storage device, prompts the data storage device to generate an error message.

10. A method according to claim 1, wherein the second set of commands comprises only one command.

11. A method according to claim 10, wherein the second set of commands comprises the IDE 01h command.

12. A method according to claim 1, wherein the second set of commands comprises a plurality of commands.

13. A method according to claim 12 wherein the second set of commands comprises at least one reserved IDE command.

14. A method for inhibiting commands sent to a data storage device, the method comprising:
    determining whether an Integrated Drive Electronics (IDE) command sent to the data storage device is from a first set of IDE commands;

if the IDE command sent to the data storage device is from the first set of IDE commands, generating signals indicative of a command from a second set of IDE commands on a second bus coupled to the data storage device while an input/output write signal to the data storage device is deasserted, wherein the command from the second set of IDE commands is different than the IDE command sent to the data storage device; and generating an error message using the data storage device upon the data storage device receiving the command from the second set of IDE commands.

15. A method according to claim 14, further comprising:

generating an interrupt using the data storage device upon generating the error message; and reading the error message from a register of the data storage device in response to the interrupt.

16. A method according to claim 14, further comprising if the IDE command sent to the data storage device is not from the first set of IDE commands, generating signals indicative of the IDE command sent to the data storage device on the second bus while the input/output write signal to the data storage device is deasserted.

17. A method according to claim 14, wherein determining whether the IDE command sent to the data storage device is from the first set of IDE commands comprises determining whether the IDE command at a first bus coupled to a host computer is from the first set of IDE commands.

18. A method according to claim 14, wherein generating signals indicative of the IDE command sent to the data storage device on the second bus comprises coupling at least a portion of a first bus to the second bus.

19. A method according to claim 14, wherein generating signals indicative of the IDE command on the second bus comprises coupling an output of a command generator to the second bus.

20. An Integrated Drive Electronics (IDE) interface device, comprising:

an input to receive signals associated with IDE commands from a host computer;

an output to operatively couple with a data storage device; and a control device, operatively coupled with the input and the output, the control device configured to determine whether an IDE command from the host computer is from a first set of IDE commands based on signals at the input;

wherein the control device is further configured to, if the IDE command from the host computer is from the first set of IDE commands, generate signals indicative of a command from a second set of IDE commands at the output while an input/output write signal to the data storage device is deasserted;

wherein the command from the second set of IDE commands is different than the IDE command from the host computer.

21. An IDE interface device according to claim 20, wherein the control device is further configured to, if the IDE command from the host computer is not from the first set of IDE commands, generate signals indicative of the command from the host computer at the output while an input/output write signal to the data storage device is deasserted.

22. An IDE interface device according to claim 20, wherein the output is to be coupled at least to a plurality of IDE data signals associated with the data storage device.

23. An IDE interface device according to claim 20, wherein the plurality of IDE data signals comprises the lower eight IDE data signals associated with the data storage device.

24. An IDE interface device according to claim 20, wherein at least a portion of the input comprises an input/output port.

25. An IDE interface device according to claim 20, wherein the output comprises an input/output port.

26. An IDE interface device according to claim 20, wherein the control device comprises:

a logic device operatively coupled to the input, the logic device configured to generate a control signal indicative of whether the IDE command from the host computer is from the first set of IDE commands based on signals at the input;

a data switch operatively coupled to the output and the control signal, the data switch configured to couple the signals indicative of the command from a second set of IDE commands to the output when the control signal indicates the IDE command from the host computer is from the first set of IDE commands.

27. An IDE interface device according to claim 26, wherein the data switch is operatively coupled to a portion of the input, wherein the data switch is further configured to couple the portion of the input to the output when the control signal indicates the IDE command from the host computer is not from the first set of IDE commands.

28. An IDE interface device according to claim 27, wherein the portion of the input comprises the lower eight IDE data signals associated with the host computer.

29. An IDE interface devise according to claim 26, wherein the logic device comprises programmable array logic.

30. An IDE interface devise according to claim 26, wherein the data switch is a bi-directional switch.

* * * * *

UNITED STATES PATENT AND TRADEMARK OFFICE
CERTIFICATE OF CORRECTION

PATENT NO. : 6,823,419 B2
DATED : November 23, 2004
INVENTOR(S) : Charles R. Berg et al.

It is certified that error appears in the above-identified patent and that said Letters Patent is hereby corrected as shown below:

Title page,
Item [74], *Attorney, Agent, or Firm*, please delete "Gorun" and insert -- Borun --.

Signed and Sealed this

Thirty-first Day of May, 2005

JON W. DUDAS
*Director of the United States Patent and Trademark Office*